United States Patent
Xiao et al.

(10) Patent No.: US 12,450,693 B2
(45) Date of Patent: Oct. 21, 2025

(54) IMAGE PROCESSING METHOD AND ELECTRONIC DEVICE

(71) Applicant: Honor Device Co., Ltd., Shenzhen (CN)

(72) Inventors: Bin Xiao, Shenzhen (CN); Yang Lu, Shenzhen (CN); Congchao Zhu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/041,757

(22) PCT Filed: Sep. 6, 2022

(86) PCT No.: PCT/CN2022/117326
§ 371 (c)(1),
(2) Date: Feb. 15, 2023

(87) PCT Pub. No.: WO2023/124202
PCT Pub. Date: Jul. 6, 2023

(65) Prior Publication Data
US 2024/0281931 A1    Aug. 22, 2024

(30) Foreign Application Priority Data
Dec. 29, 2021    (CN) .......................... 202111644641.7

(51) Int. Cl.
*G06T 5/50*    (2006.01)
*G06N 3/0464*    (2023.01)
(Continued)

(52) U.S. Cl.
CPC ............. *G06T 5/50* (2013.01); *G06N 3/0464* (2023.01); *H04N 23/617* (2023.01);
(Continued)

(58) Field of Classification Search
CPC ............. G06T 5/50; G06T 2207/10144; G06T 2207/20208; G06T 2207/20221;
(Continued)

(56) References Cited

U.S. PATENT DOCUMENTS

2010/0091119 A1    4/2010    Lee et al.
2014/0307044 A1    10/2014    Sharma et al.
(Continued)

FOREIGN PATENT DOCUMENTS

CN    108900782 A    11/2018
CN    109788207 A    5/2019
(Continued)

OTHER PUBLICATIONS

See IP Summaries on Jun. 13, 2025. Searching from STIC 2003-2025.*
Nima Khademi Kalantari and Ravi Ramamoorthi, "Deep High Dynamic Range Imaging of Dynamic Scenes," ACM Transactions on Graphics, vol. 36, No. 4, Article 144;36, 4, Article 144, Jul. 2017; pp. 144:1-144:12; 12 total pages.

*Primary Examiner* — Quang N Vo
(74) *Attorney, Agent, or Firm* — Rimon PC

(57) ABSTRACT

An image processing method and an electronic device are disclosed. The method includes: obtaining a first image sequence in response to a first operation, where the first image sequence includes a first long-exposure image, a first medium-exposure image, and a first short-exposure image; performing preprocessing on the first image sequence to obtain a second image sequence; when the second image sequence includes a second medium-exposure image and a second short-exposure image; performing fusion processing on the second image sequence to obtain a fused image, where the fused image includes a ghosting region, and the ghosting region is an image region that includes a ghosting artifact in the fused image; and processing the fused image to obtain a third image; when the second image sequence comprises only a second medium-exposure image, output- (Continued)

ting a low-dynamic range image. Based on this application, ghosting artifacts can be removed from high-dynamic range images.

20 Claims, 12 Drawing Sheets

(51) Int. Cl.
  *H04N 23/617* (2023.01)
  *H04N 23/63* (2023.01)
  *H04N 23/667* (2023.01)
  *H04N 23/741* (2023.01)

(52) U.S. Cl.
  CPC ......... *H04N 23/632* (2023.01); *H04N 23/667* (2023.01); *H04N 23/741* (2023.01); *G06T 2207/10144* (2013.01); *G06T 2207/20208* (2013.01); *G06T 2207/20221* (2013.01)

(58) Field of Classification Search
  CPC .... H04N 23/667; H04N 23/617; H04N 23/41; H04N 23/632; G06N 3/0464
  See application file for complete search history.

(56) References Cited

U.S. PATENT DOCUMENTS

| | | | |
|---|---|---|---|
| 2019/0014249 A1* | 1/2019 | Zhu | H04N 23/743 |
| 2019/0222766 A1* | 7/2019 | Molgaard | H04N 23/80 |
| 2020/0092458 A1 | 3/2020 | Wang et al. | |
| 2022/0230283 A1 | 7/2022 | Wang et al. | |

FOREIGN PATENT DOCUMENTS

| | | | |
|---|---|---|---|
| CN | 110121882 B | 9/2020 | |
| CN | 111800580 A | 10/2020 | |
| CN | 111953893 A | 11/2020 | |
| CN | 112085673 A | 12/2020 | |
| CN | 112449120 A | 3/2021 | |
| CN | 112581415 A | 3/2021 | |
| CN | 112785537 A | 5/2021 | |
| CN | 113379615 A | 9/2021 | |
| CN | 111418201 B | 10/2021 | |
| CN | 113824873 A | 12/2021 | |

\* cited by examiner

| a | b | c | d | e | f | g | h | i | j |
|---|---|---|---|---|---|---|---|---|---|
| a | b | c | d | e | f | g | h | i | j |
| a | b | c | d | e | f | g | h | i | j |
| a | b | c | d | e | f | g | h | i | j |
| a | b | c | d | e | f | g | h | i | j |

(a)

| a | b | c | d | e | f | g | h | i | j |
|---|---|---|---|---|---|---|---|---|---|
| a | b | c | d | e | f | g | h | i | j |
| a | b | c | d | e | f | g | h | i | j |
| a | b | c | d | e | f | g | h | i | j |
| a | b | c | d | e | f | g | h | i | j |

(b)

| a | b | c | d | e | f | g | h | i | j |
|---|---|---|---|---|---|---|---|---|---|
| a | b | c | d | e | f | g | h | i | j |
| a | b | c | d | e | f | g | h | i | j |
| a | b | c | d | e | f | g | h | i | j |
| a | b | c | d | e | f | g | h | i | j |

IMAGE PROCESSING METHOD AND ELECTRONIC DEVICE

CROSS-REFERENCE TO RELATED APPLICATIONS

This application is a national stage of International Application No. PCT/CN2022/117326, filed on Sep. 6, 2022, which claims priority to Chinese Patent application Ser. No. 202111644641.7, filed on Dec. 29, 2021. The disclosures of both of the aforementioned applications are hereby incorporated by reference in their entireties.

TECHNICAL FIELD

This application relates to the field of image processing, and specifically, to an image processing method and an electronic device.

BACKGROUND

The high-dynamic range (high-dynamic range, HDR) imaging technology is for expanding a dynamic range of images, so that an obtained image can include detail information of both bright and dark areas in shooting scenes. In this way, the quality of images can be improved. At present, a common method is to synthesize a frame of high-dynamic range image by fusing a plurality of frames of image with different exposure times. However, when images of different exposure times are being obtained, a photographed object in the shooting scene may move, the electronic device may shake, or the like, so that there is a difference in image content between the images with different exposure times. This causes a problem such as ghosting artifacts in the synthesized high-dynamic range image.

Therefore, how to remove ghosting artifacts from high-dynamic range images to improve the quality of the high-dynamic range images has become a problem to be urgently resolved.

SUMMARY

This application provides an image processing method and an electronic device, so as to remove ghosting artifacts from high-dynamic range images to improve quality of the high-dynamic range images.

According to a first aspect, an image processing method is provided, applied to an electronic device and including:

displaying a first screen, where the first screen includes a first control;

detecting a first operation on the first control;

obtaining a first image sequence in response to the first operation, where the first image sequence includes a first long-exposure image, a first medium-exposure image, and a first short-exposure image;

performing preprocessing on the first image sequence to obtain a second image sequence, where the preprocessing is used to select images in the first image sequence that meet a preset condition, and the second image sequence includes a second medium-exposure image and a second short-exposure image;

performing fusion processing on the second image sequence to obtain a fused image, where the fused image includes a ghosting region, and the ghosting region is an image region that includes a ghosting artifact in the fused image; and processing the fused image to obtain a third image, where the third image includes part of the fused image, and the third image does not include the ghosting region.

Optionally, in a possible implementation, the first screen may be a photographing screen, the first control may be a control, for indicating to take a photograph, on the photographing screen, and the first operation may be a tap operation on the control for indicating to take a photograph.

Optionally, in a possible implementation, the first screen may be a video shooting screen, the first control may be a control, for indicating to shoot a video, on the video shooting screen, and the first operation may be a tap operation on the control for indicating to shoot a video. Optionally, in a possible implementation, the first screen may be a video call screen, the first control may be a control, for indicating to make a video call, on the video call screen, and the first operation may be a tap operation on the control for indicating to make a video call.

It should be understood that the foregoing description uses an example in which the first operation is a tap operation. The first operation may further include a voice indication operation or another operation that indicates the electronic device to take a photograph or make a video call. The foregoing describes an example and does not constitute any limitation on this application. Optionally, the first image sequence may be a sequence of images with different exposure times collected by an image sensor. For example, the first image sequence may be a sequence of images collected by an image sensor in the electronic device when a high-dynamic range image shooting mode is enabled. The first image sequence may include a short-exposure image, a medium-exposure image, and a long-exposure image.

It should be understood that the medium-exposure image may be an image whose exposure value is a standard exposure value (for example, EV0), the long-exposure image may be an image whose exposure value is greater than the standard exposure value, and the short-exposure image may be an image whose exposure value is less than the standard exposure value.

It should be further understood that the third image including part of the fused image may be that the third image has an image region with same image content as the fused image. The third image may be an image obtained by removing the ghosting region from the fused image. For example, the third image may be a high-dynamic range image with ghosting artifacts removed. In this embodiment of this application, preprocessing is performed on the obtained first image sequence to select the images in the first image sequence that meet the preset condition to obtain the second image sequence. Fusion processing is performed on the second image sequence to obtain the fused image. Processing is performed on the fused image to obtain the third image. The third image includes part of the fused image but not the ghosting region. In this embodiment of this application, before fusion processing is performed, selection on the images in the first image sequence is performed to obtain the second image sequence that meets the preset condition. This can avoid the ghosting problem resulting from an excessive content difference between image frames due to fusion processing directly performed on the first image sequence. In addition, in this embodiment of this application, the fused image may be further processed so that the output fused image is a high-dynamic range image with ghosting artifacts removed.

The second image sequence is obtained through selection from exposure images in the first image sequence. This can avoid ghosting regions in the fused image output from the fusion model to some extent, thereby improving the quality of high-dynamic range images.

With reference to the first aspect, in some implementations of the first aspect, the processing the fused image to obtain a third image includes:

performing ghosting detection processing on a reference image and the second short-exposure image to obtain a mask, where the reference image is any frame of image in the first medium-exposure image; and processing the fused image based on the mask to obtain the third image.

In this embodiment of this application, some large-range ghosting artifacts, such as ghosting artifacts caused by movement of a photographed object in a short-exposure image in an over-exposure region of the reference image, may not be detected during preprocessing. As a result, some ghosting regions are still present in the fused high-dynamic range image. In this embodiment of this application, the third image (for example, the high-dynamic range image) may be further processed to obtain a high-dynamic range image with ghosting artifacts removed.

With reference to the first aspect, in some implementations of the first aspect, the processing the fused image based on the mask to obtain the third image includes:

determining the ghosting region in the fused image based on the mask; and processing the ghosting region according to a hole filling algorithm to obtain the third image.

With reference to the first aspect, in some implementations of the first aspect, the preset condition includes a first preset condition, the first preset condition is that an exposure value of an image in the first image sequence is a preset exposure value, and the performing preprocessing on the first image sequence to obtain a second image sequence includes:

selecting first target exposure images in the first image sequence that meet the first preset condition, where the first target exposure images include at least two frames of image; and obtaining the second image sequence based on the first target exposure images.

In this embodiment of this application, the preset condition may include a first preset condition. Based on the preset exposure value, first target exposure images with an exposure value equal to the preset exposure value may be determined from the first image sequence, and the second image sequence may be obtained based on the first target exposure images.

With reference to the first aspect, in some implementations of the first aspect, the preset exposure value includes a first preset exposure value and/or a second preset exposure value, the first preset exposure value is a preset exposure value of the first long-exposure image, and the second preset exposure value is a preset exposure value of the first short-exposure image.

Optionally, the first preset exposure value may be a preset value or a preset exposure value range.

Optionally, the second preset exposure value may be a preset value or a preset exposure value range.

In this embodiment of this application, selection on long-exposure images included in the first image sequence may be performed based on the first preset exposure value, and selection on short-exposure images included in the first image sequence may be performed based on the second preset exposure value.

With reference to the first aspect, in some implementations of the first aspect, the preset condition includes a second preset condition, the second preset condition is that a proportion of same image content between an image in the first target exposure images and the reference image is a preset proportion value, and the obtaining the second image sequence based on the first target exposure images includes:

comparing the first target exposure images with the reference image to obtain a proportion value, where the proportion value is used to indicate a proportion of same image content as the reference image;

selecting, based on the proportion value, second target exposure images in the first target exposure images that meet the second preset condition; and forming the second image sequence by the second target exposure images.

In this embodiment of this application, the preset condition may include the first preset condition and the second preset condition. Selection on exposure images in the first image sequence may be performed based on the preset exposure value to obtain the first target exposure images. Selection on the first target exposure images is performed based on the preset proportion value to obtain the second target exposure images, and the second target exposure images form the second image sequence.

With reference to the first aspect, in some implementations of the first aspect, the performing fusion processing on the second image sequence to obtain the fused image includes:

inputting the second image sequence into a fusion model to obtain the fused image, where the fusion model is used for fusion processing on the second image sequence.

Optionally, in this embodiment of this application, the fusion model may be a pre-trained neural network.

With reference to the first aspect, in some implementations of the first aspect, the fusion model is a convolutional neuron network.

With reference to the first aspect, in some implementations of the first aspect, before the detecting a first operation on the first control, the method further includes:

detecting a second operation, where the second operation is used to indicate enabling a high-dynamic range image shooting mode of the electronic device.

With reference to the first aspect, in some implementations of the first aspect, before the detecting a first operation on the first control, the method further includes:

obtaining a preview image;

determining a first value based on the preview image, where the first value is used to indicate a proportion of an over-exposure region in the preview image; and determining based on the first value to enable the high-dynamic range image shooting mode of the electronic device.

Optionally, the preview image may be an image displayed in real time on a display of the electronic device after a user turns on a camera but before the user presses the photo/video button.

Optionally, the first value may be a dynamic range value of the preview image.

In this embodiment of this application, before detecting the first operation of the user on the first control, the electronic device may enable the high-dynamic range image shooting mode. For example, the electronic device may autonomously determine, based on a dynamic range (dynamic range, DR) value of the obtained preview image, whether to enable the high-dynamic range image shooting mode.

According to a second aspect, an electronic device is provided. The electronic device includes one or more processors and a memory, where the memory is coupled to the one or more processors, the memory is configured to store computer program code, the computer program code includes computer instructions, and the one or more processors invoke the computer instructions to cause the electronic device to perform the following:

displaying a first screen, where the first screen includes a first control;

detecting a first operation on the first control;

obtaining a first image sequence in response to the first operation, where the first image sequence includes a first long-exposure image, a first medium-exposure image, and a first short-exposure image;

performing preprocessing on the first image sequence to obtain a second image sequence, where the preprocessing is used to select images in the first image sequence that meet a preset condition, and the second image sequence includes a second medium-exposure image and a second short-exposure image;

performing fusion processing on the second image sequence to obtain a fused image, where the fused image includes a ghosting region, and the ghosting region is an image region that includes a ghosting artifact in the fused image; and processing the fused image to obtain a third image, where the third image includes part of the fused image, and the third image does not include the ghosting region.

With reference to the second aspect, in some implementations of the second aspect, the one or more processors invoke the computer instructions to cause the electronic device to perform the following:

performing ghosting detection processing on a reference image and the second short-exposure image to obtain a mask, where the reference image is any frame of image in the first medium-exposure image; and processing the fused image based on the mask to obtain the third image.

With reference to the second aspect, in some implementations of the second aspect, the one or more processors invoke the computer instructions to cause the electronic device to perform the following:

determining the ghosting region in the fused image based on the mask; and processing the ghosting region according to a hole filling algorithm to obtain the third image.

With reference to the second aspect, in some implementations of the second aspect, the preset condition includes a first preset condition, and the one or more processors invoke the computer instructions to cause the electronic device to perform the following:

selecting first target exposure images in the first image sequence that meet the first preset condition, where the first target exposure images include at least two frames of image; and obtaining the second image sequence based on the first target exposure images.

With reference to the second aspect, in some implementations of the second aspect, the preset exposure value includes a first preset exposure value and/or a second preset exposure value, the first preset exposure value is a preset exposure value of the first long-exposure image, and the second preset exposure value is a preset exposure value of the first short-exposure image.

With reference to the second aspect, in some implementations of the second aspect, the preset condition includes a second preset condition, the second preset condition is that a proportion of same image content between an image in the first target exposure images and the reference image is a preset proportion value, and the one or more processors invoke the computer instructions to cause the electronic device to perform the following:

comparing the first target exposure images with the reference image to obtain a proportion value, where the proportion value is used to indicate a proportion of same image content as the reference image;

selecting, based on the proportion value, second target exposure images in the first target exposure images that meet the second preset condition; and forming the second image sequence by the second target exposure images.

With reference to the second aspect, in some implementations of the second aspect, the one or more processors invoke the computer instructions to cause the electronic device to perform the following:

inputting the second image sequence into a fusion model to obtain the fused image, where the fusion model is used for fusion processing on the second image sequence.

With reference to the second aspect, in some implementations of the second aspect, the fusion model is a convolutional neuron network.

With reference to the second aspect, in some implementations of the second aspect, the one or more processors invoke the computer instructions to cause the electronic device to perform the following:

detecting a second operation, where the second operation is used to indicate enabling a high-dynamic range image shooting mode of the electronic device.

With reference to the second aspect, in some implementations of the second aspect, the one or more processors invoke the computer instructions to cause the electronic device to perform the following:

obtaining a preview image;

determining a first value based on the preview image, where the first value is used to indicate a proportion of an over-exposure region in the preview image; and determining based on the first value to enable the high-dynamic range image shooting mode of the electronic device.

With reference to the second aspect, in some implementations of the second aspect, the first screen is a photographing screen, and the first control is a control for indicating to take a photograph.

With reference to the second aspect, in some implementations of the second aspect, the first screen is a video shooting screen, and the first control is a control for indicating to shoot a video.

With reference to the second aspect, in some implementations of the second aspect, the first screen is a video call screen, and the first control is a control for indicating to make a video call.

According to a third aspect, an electronic device is provided, including a module or unit for executing the image processing method according to the first aspect or any one implementation of the first aspect.

According to a fourth aspect, an electronic device is provided. The electronic device includes one or more processors, a memory, and a display, where the memory is coupled to the one or more processors, the memory is configured to store computer program code, the computer program code includes computer instructions, and the one or more processors invoke the computer instructions to cause the electronic device to execute the image processing method according to the first aspect or any one implementation of the first aspect.

According to a fifth aspect, a chip system is provided, where the chip system is applied to an electronic device, the chip system includes one or more processors, and the processor is configured to invoke computer instructions to cause the electronic device to execute the image processing method according to the first aspect or any one implementation of the first aspect.

According to a sixth aspect, a computer-readable storage medium is provided. The computer-readable storage medium stores computer program code, and when the computer program code is executed by an electronic device, the electronic device is caused to execute the image processing method according to the first aspect or any one implementation of the first aspect.

According to a seventh aspect, a computer program product is provided. The computer program product stores computer program code, and when the computer program code is executed by an electronic device, the electronic device is caused to execute the image processing method according to the first aspect or any one implementation of the first aspect.

In the embodiments of this application, preprocessing is performed on the obtained first image sequence to select the images in the first image sequence that meet the preset condition to obtain the second image sequence. Fusion processing is performed on the second image sequence to obtain the fused image. Processing is performed on the fused image to obtain the third image. The third image includes part of the fused image but not the ghosting region. In the embodiments of this application, before fusion processing is performed, selection on the images in the first image sequence is performed to obtain the second image sequence that meets the preset condition. This can avoid the ghosting problem resulting from an excessive content difference between image frames due to fusion processing directly performed on the first image sequence. In addition, in the embodiments of this application, the fused image may be further processed so that the output fused image is a high-dynamic range image with ghosting artifacts removed.

BRIEF DESCRIPTION OF DRAWINGS

FIG. 5 is a schematic diagram of image content according to an embodiment of this application;

DETAILED DESCRIPTION OF EMBODIMENTS

Figure 1:
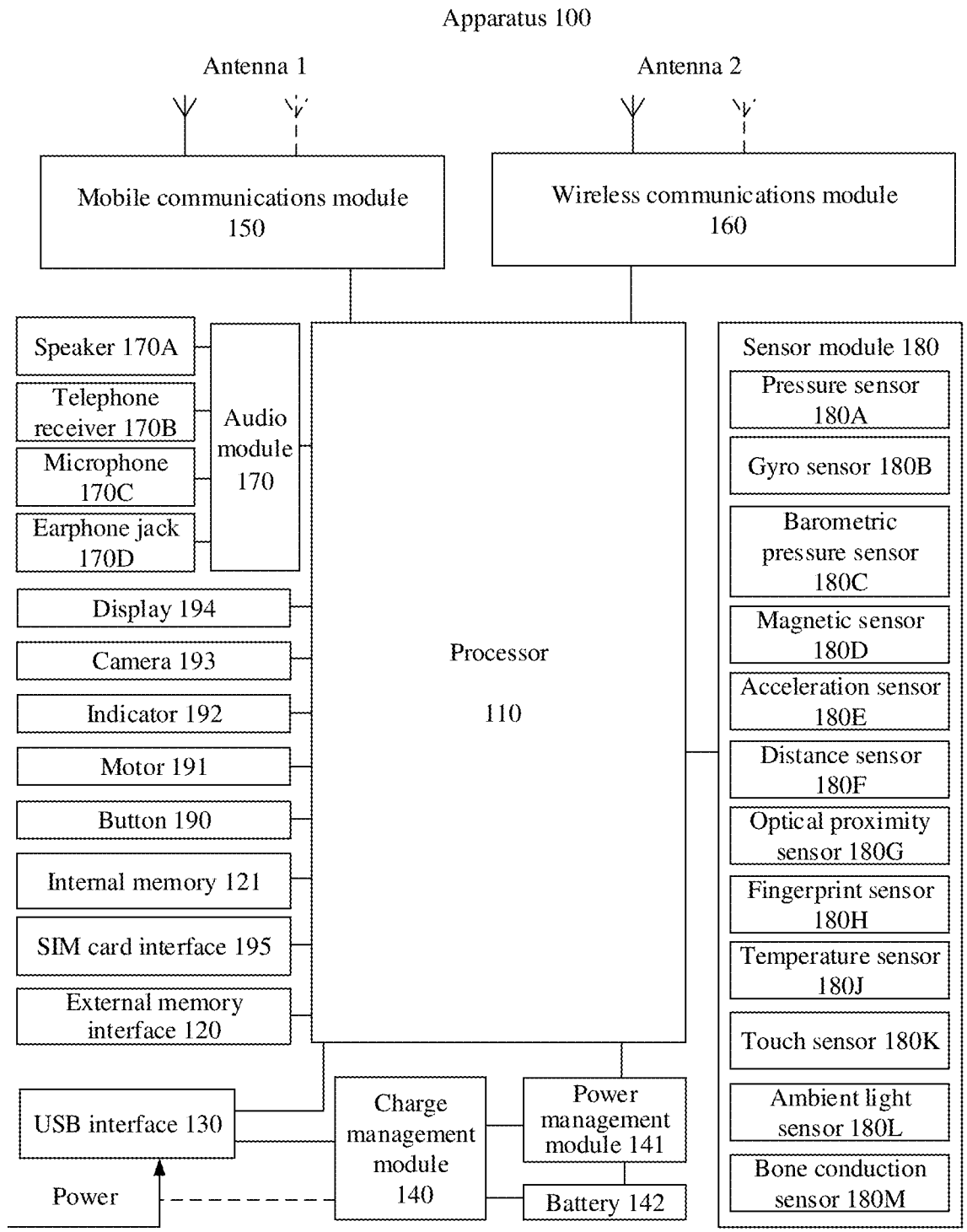
FIG. 1 is a schematic diagram of a hardware system of an apparatus to which this application is applicable.

In embodiments of this application, the following terms "first", "second", "third", and the like are used only for ease of description and cannot be construed as indicating or implying relative importance or implicitly indicating a quantity of technical features.

For ease of understanding the embodiments of this application, related concepts used in the embodiments of this application are briefly described first.

1. High-Dynamic Range (High Dynamic Range, HDR) Image

A high-dynamic range image is an image obtained by synthesizing images with different exposure times and using the best details included in an image with each exposure time. High-dynamic range images can provide more dynamic ranges and image details, and can better reflect visual effects in real environments.

2. Exposure Time

An exposure time is a time interval from opening a shutter to closing the shutter.

3. Exposure Value (Exposure Value, EV)

An exposure value represents all camera aperture shutter combinations that provide the same exposure.

4. Dynamic Range (Dynamic Range, DR) Value

A DR value is used to indicate proportion information of an over-exposure region in a preview image obtained by a main camera module in an entire image.

5. Ghosting

Ghosting refers to an abnormal region that does not actually exist in a shooting scene but appears in an image of the shooting scene. For example, jitter or movement of a photographed object during shooting causes an excessively large difference between a plurality of frames of image in image content. An abnormal region that does not exist in the shooting scene but appears in a fused image obtained by fusing the plurality of frames of image is a ghosting artifact.

6. Dilation and Erosion

Erosion and dilation are processing on a white portion (a highlight portion) in an image. An erosion operation is similar to median smoothing processing, in which a minimum value within neighborhood of each pixel position is selected. A dilation operation is similar to an erosion operation in principle. In the dilation operation, a maximum value within neighborhood of each pixel position is selected and used as an output grayscale value.

7. Hole Filling Algorithm

Because an object moves between a plurality of frames of image, a fused image obtained after fusion is performed on the plurality of frames of image includes a region with information loss. The region with information loss may be referred to as a hole. A hole filling algorithm is an algorithm for detecting the region with information loss and filling the region with information loss. For example, the region with information loss may be filled by using a filter.

8. Mask (Mask)

A selected image, pattern, or object is used to cover (all or part of) a processed image to control a processed region of the image. The selected image or object used for covering is referred to as a mask or a template.

9. Neural Network

A neural network is a network formed by connecting a plurality of single neural units, that is, an output of one neural unit may be an input of another neural unit. An input of each neural unit may be connected to a local receptive field of a previous layer to extract features of the local receptive field, where the local receptive field may be a region formed by several neural units.

10. Convolutional Neuron Network

Convolutional neuron network (convolutional neuron network, CNN) is a deep neural network with a convolutional structure. A convolutional neuron network includes a feature extractor containing a convolutional layer and a subsampling layer, where the feature extractor may be considered as a filter. The convolutional layer is a neuron layer for convolving an input signal in the convolutional neuron network. In the convolutional layer of the convolutional neural network, one neuron may be connected to only part of adjacent-layer neurons. One convolutional layer usually contains several feature planes, and each feature plane may be formed by some neural units arranged in a rectangle. Neural units on the same feature plane share weights, and the shared weights are convolution kernels.

11. Back Propagation Algorithm

In a neural network, the error back propagation (back propagation, BP) algorithm may be used to correct parameter values in an initial neural network model during training, so that the neural network model has increasingly small reconstruction error loss. Specifically, error loss is generated when the input signal is passed forward to the output. Parameters in the initial neural network model are updated through back propagation of the error loss information to converge the error loss. The back propagation algorithm is a back propagation movement dominated by error loss, aiming to obtain parameters of an optimal neural network model, such as a weight matrix.

The following describes an image processing method and an electronic device in the embodiments of this application with reference to the accompanying drawings.

FIG. 1 shows a hardware system of an apparatus to which this application is applicable.

The apparatus 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, personal digital assistant (personal digital assistant, PDA), a projector, or the like. The embodiments of this application impose no limitation on a specific type of the apparatus 100.

The apparatus 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute any specific limitation on the apparatus 100. In some other embodiments of this application, the apparatus 100 may include more or fewer components than those shown in FIG. 1, or the apparatus 100 may include a combination of some of the components shown in FIG. 1, or the apparatus 100 may include sub-components of some of the components shown in FIG. 1. The components shown in FIG. 1 may be implemented by hardware, software, or a combination of software and hardware.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components or an integrated component. The controller may generate an operation control signal according to an instruction operation code and a timing signal, to complete control of instruction fetching and execution.

A memory for storing instructions and data may be further provided in the processor 110. In some embodiments, the memory in the processor 110 is a cache. The cache may store instructions or data recently used or repeatedly used by the processor 110. If the processor 110 needs to use the instruction or data again, the processor 110 may directly invoke the instruction or data from the memory. This avoids repeated access and reduces a waiting time of the processor 110, thereby improving efficiency of a system.

For example, the processor 110 may be configured to execute an image processing method in the embodiments of this application: displaying a first screen, where the first screen includes a first control; detecting a first operation on the first control; obtaining a first image sequence in response to the first operation, where the first image sequence includes a first long-exposure image, a first medium-exposure image, and a first short-exposure image; performing preprocessing on the first image sequence to obtain a second image sequence, where the preprocessing is used to select images in the first image sequence that meet a preset condition, and the second image sequence includes a second medium-exposure image and a second short-exposure image; performing fusion processing on the second image sequence to obtain a fused image, where the fused image includes a ghosting region, and the ghosting region is an image region that includes a ghosting artifact in the fused image; and processing the fused image to obtain a third image, where the third image includes part of the fused image, and the third image does not include the ghosting region.

A connection relationship between the modules shown in FIG. 1 is merely used as an example for description, and does not constitute any limitation on the connection relationship between the modules of the apparatus 100. Optionally, the modules of the apparatus 100 may alternatively use a combination of a plurality of connection manners in the foregoing embodiments.

A wireless communication function of the apparatus 100 may be implemented by using components such as the antenna 1, the antenna 2, the mobile communications module 150, the wireless communications module 160, the modem processor, and the baseband processor.

The antenna 1 and the antenna 2 are configured to transmit and receive electromagnetic wave signals. Each antenna in the apparatus 100 may be configured to cover one or more communication frequency bands. In addition, different antennas may be multiplexed to improve utilization of the antennas. For example, the antenna 1 may multiplex a diversity antenna used in a wireless local area network. In some other embodiments, the antenna may be used in combination with a tuning switch.

The apparatus 100 may implement a display function by using the GPU, the display 194, the application processor, and the like. The GPU is a microprocessor for image processing, and is connected to the display 194 and the application processor. The GPU is configured to perform mathematical and geometric computing for graphics rendering. The processor 110 may include one or more GPUs that execute program instructions to generate or change display information.

The display 194 may be configured to display images or videos.

The apparatus 100 may implement a shooting function by using the ISP, the camera 193, the video codec, the GPU, the display 194, the application processor, and the like.

The ISP is configured to process data fed back by the camera 193. For example, during photographing, a shutter is opened, light is transferred to a photosensitive element of the camera through a lens, an optical signal is converted to an electrical signal, and the photosensitive element of the camera transfers the electrical signal to the ISP for processing, so that the electrical signal is converted to an image visible to a naked eye. The ISP may optimize noise, brightness, and a color of the image based on algorithms. The ISP may further optimize parameters such as exposure and color temperature of a shooting scene. In some embodiments, the ISP may be disposed in the camera 193.

The camera 193 is configured to capture a static image or a video. An optical image of an object is generated by using a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal to an electrical signal, and then transfers the electrical signal to the ISP. The ISP converts the electrical signal into a digital image signal. The ISP outputs the digital image signals to the DSP for processing. The DSP converts the digital image signal into an image signal in a standard format such as red green blue (red green blue, RGB) or YUV. In some embodiments, the apparatus 100 may include one or N cameras 193, where N is a positive integer greater than 1.

The digital signal processor is configured to process digital signals, including digital image signals and other digital signals. For example, when the apparatus 100 selects a frequency, the digital signal processor is configured to perform Fourier transform and the like on energy of the frequency.

The video codec is configured to compress or decompress a digital video. The apparatus 100 may support one or more types of video codecs, so that the apparatus 100 can play or record videos in a plurality of encoding formats, for example, the moving picture experts group (moving picture experts group, MPEG)1, MPEG2, MPEG3, and MPEG4.

The gyro sensor 180B may be configured to determine a motion posture of the apparatus 100. In some embodiments, an angular velocity of the apparatus 100 around three axes (namely, x, y, and z axes) may be determined by using the gyro sensor 180B. The gyro sensor 180B may be used for image stabilization during shooting. For example, when a shutter is pressed, the gyro sensor 180B detects a shaking angle of the apparatus 100, and calculates, based on the angle, a distance that a lens module needs to be compensated for, so that the lens can move reversely to counteract the shaking of the apparatus 100, so as to implement image stabilization. The gyro sensor 180B may also be used in a navigation scenario, a somatic game scenario, and the like.

The acceleration sensor 180E may detect magnitudes of accelerations of the apparatus 100 in various directions (generally along x, y, and z axes), and may detect a magnitude and direction of gravity when the apparatus 100 is static, The acceleration sensor 180E may be further configured to identify a posture of the apparatus 100 as an input parameter of an application such as landscape/portrait mode switching or a pedometer.

The distance sensor 180F is configured to measure a distance. The apparatus 100 may measure a distance by using infrared light or a laser. In some embodiments, for example, in a shooting scene, the apparatus 100 may use the distance sensor 180F to measure a distance for rapid focusing.

The ambient light sensor 180L is configured to sense brightness of ambient light. The apparatus 100 may adaptively adjust brightness of the display 194 based on the sensed brightness of the ambient light. The ambient light sensor 180L may be further configured to automatically adjust white balance during photographing. The ambient light sensor 180L may also cooperate with the optical proximity sensor 180G to detect whether the apparatus 100 is in a pocket to avoid accidental touches.

The fingerprint sensor 180H is configured to collect fingerprints. The apparatus 100 can implement functions such as unlocking, application lock access, shooting, and call answering by using collected fingerprint characteristics.

The touch sensor 180K is also referred to as a touch component. The touch sensor 180K may be disposed on the display 194, and the touch sensor 180K and the display 194 form a touchscreen, also referred to as touch control screen. The touch sensor 180K is configured to detect a touch operation performed on or near the touch sensor 180K. The touch sensor 180K may transfer the detected touch operation to the application processor for determining a touch event type, and may provide a visual output related to the touch operation by using the display 194. In some other embodiments, the touch sensor 180K may alternatively be disposed on a surface of the apparatus 100 at a different location than the display 194.

A hardware system of the apparatus 100 is described in detail above, and a software system of the apparatus 100 is described below.

Figure 2:
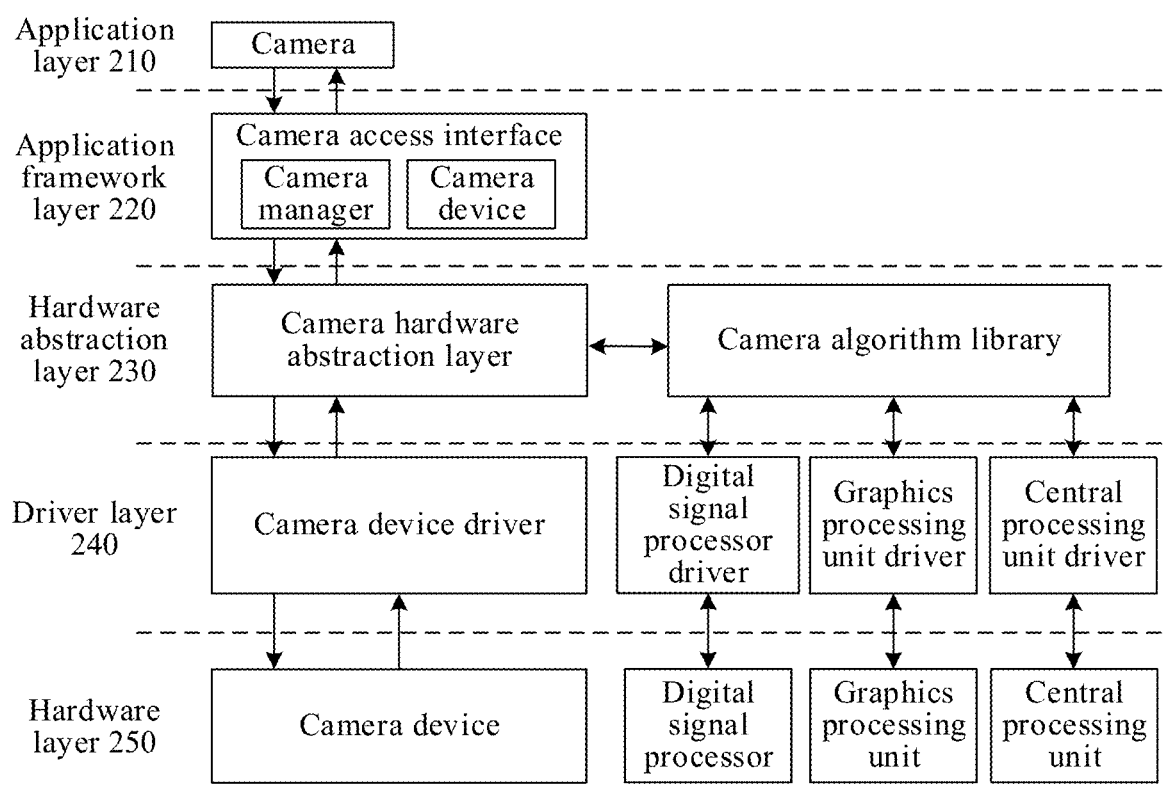
FIG. 2 is a schematic diagram of a software system of an electronic device to which this application is applicable.

FIG. 2 is a schematic diagram of a software system of an electronic device according to an embodiment of this application.

As shown in FIG. 2, a system architecture may include an application layer 210, an application framework layer 220, a hardware abstraction layer 230, a driver layer 240, and a hardware layer 250.

The application layer 210 may include applications such as camera, gallery, calendar, phone, map, navigation, WLAN, Bluetooth, music, video, and messaging.

The application framework layer 220 provides an application programming interface (application programming interface, API) and a programming framework for an application program at the application layer. The application framework layer may include some predefined functions.

For example, the application framework layer 220 may include a camera access interface, and the camera access interface may include a camera manager and a camera device. The camera manager may be used to provide an access interface for managing the camera, and the camera device may be used to provide an interface for accessing the camera.

The hardware abstraction layer 230 is configured to abstract hardware. For example, the hardware abstraction layer may include a camera abstraction layer and other hardware device abstraction layers; and the camera hardware abstraction layer is able to call algorithms in a camera algorithm library.

For example, the camera algorithm library may include a software algorithm of an image processing method according to the embodiments of this application. When the software algorithm of the image processing method in the camera algorithm library is called, the image processing method according to the embodiment of this application is executed.

The driver layer 240 is configured to provide drivers for different hardware devices. For example, the driver layer may include a camera device driver, a digital signal processor driver, a graphics processing unit driver, or a central processing unit driver.

The hardware layer 250 may include a camera device and other hardware devices.

For example, the hardware layer 250 includes, but is not limited to, a camera device, a digital signal processor, a graphics processing unit, or a central processing unit.

At present, a frame of high-dynamic range image is synthesized by fusing a plurality of frames of image with different exposure times. However, when image frames of different exposure times are being obtained, an object in a shooting scene may move or an electronic device may shake or the like, so that there is a difference in image content between the image frames with different exposure times. That is, the image frames with different exposure times have inconsistent image content. As a result, a problem such as ghosting may occur in the high-dynamic range image synthesized by fusing a plurality of frames of image with different exposure times.

In view of this, an embodiment of this application provides an image processing method. Exposure images that meet a preset condition may be selected from a first image sequence by performing preprocessing on the obtained first image sequence. This can avoid a ghosting region resulting from fusion processing directly performed on the first image sequence. In addition, in this embodiment of this application, when a second image sequence includes a short-exposure image, further processing may be performed on the fused image, so as to ensure that the output high-dynamic range image is a high-dynamic range image with ghosting artifacts removed. Therefore, the image processing method according to this embodiment of this application can be used to remove ghosting artifacts from high-dynamic range images and improve the image quality of high-dynamic range images.

Figure 3:
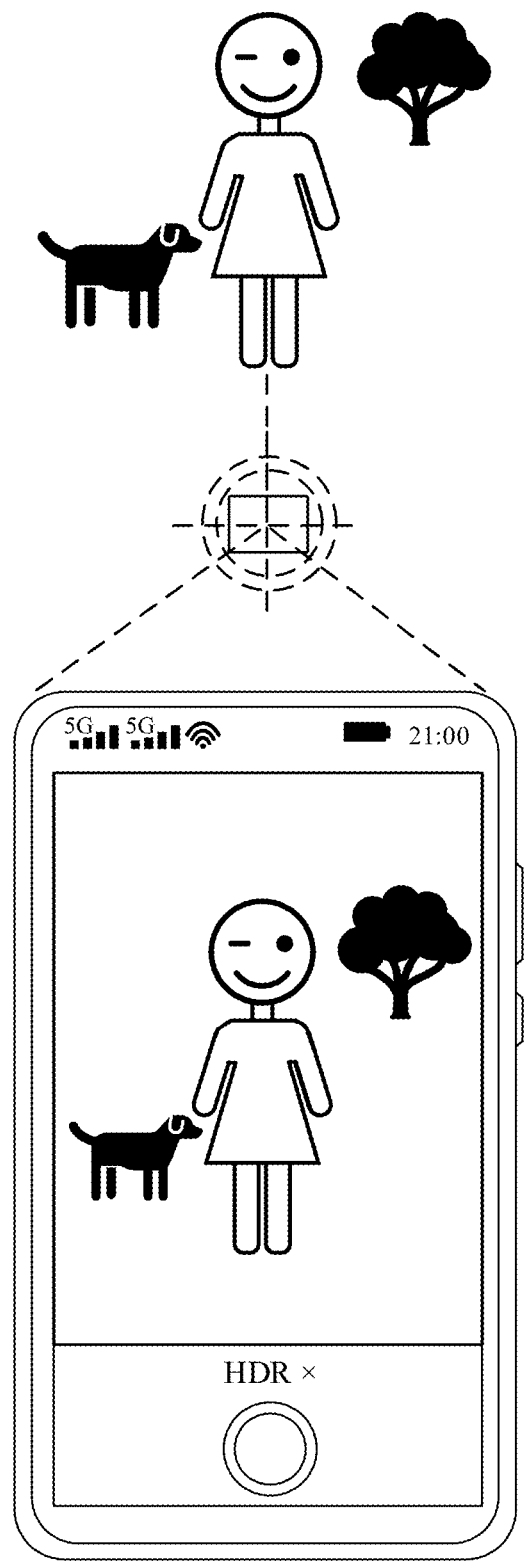
FIG. 3 is a schematic diagram of an application scenario to which an embodiment of this application is applicable.

The following describes application scenarios of the image processing method provided in this embodiment of this application by using examples with reference to FIG. 3.

For example, the image processing method according to this embodiment of this application may be applied in the photographing field (for example, single-scene photographing and dual-scene photographing). For example, as shown in FIG. 3, when an electronic device performs photographing with a high-dynamic range image shooting mode enabled, the image processing method according to this embodiment of this application may be used to perform image processing on an obtained image sequence to output a high-dynamic range image with ghosting artifacts removed.

The scenario shown in FIG. 3 is an example. The image processing method according to this embodiment of this application may also be applied in the video field, where the video field may include, but is not limited to, the following scenarios:

video call, video conference application, long and short video application, video livestreaming application, video class application, portrait AI mirror application, video recording based on system camera recording function, video surveillance, and the like.

It should be understood that the foregoing describes an example application scenario, and does not constitute any limitation to the application scenarios of this application.

The following describes in detail the image processing method provided in the embodiments of this application with reference to FIG. 4 to FIG. 12.

Figure 4:
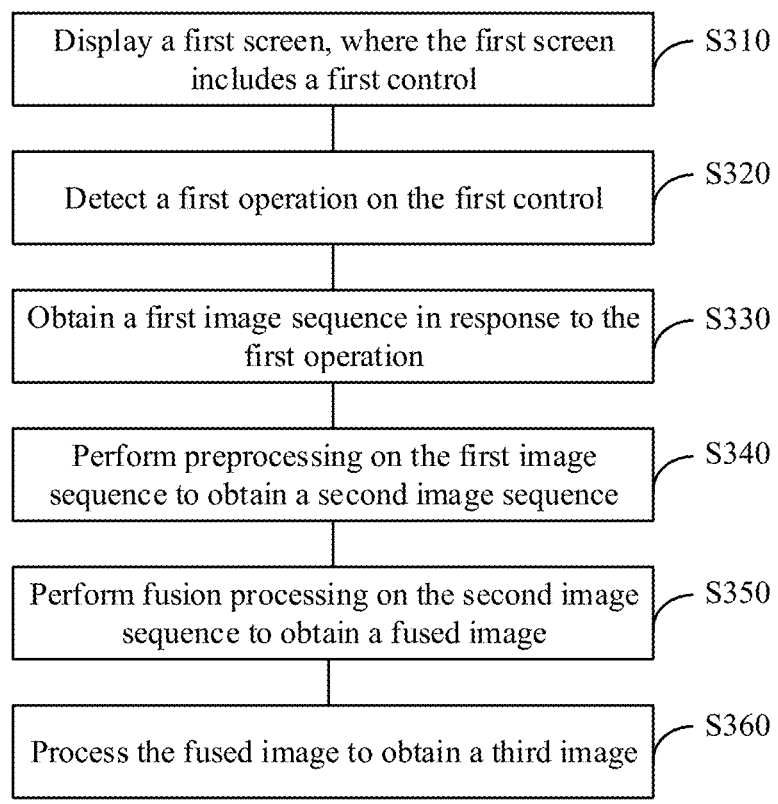
FIG. 4 is a schematic flowchart of an image processing method according to an embodiment of this application.

FIG. 4 is a schematic diagram of an image processing method according to an embodiment of this application.

It should be understood that the image processing method shown in FIG. 4 may be executed by the apparatus shown in FIG. 1. The method shown in FIG. 4 includes step S310 to step S360. The following describes step S310 to step S360 in detail.

Step S310: Display a first screen, where the first screen includes a first control.

In an example, the first screen may be a photographing screen, and the first control may be a control, for indicating to take a photograph, on the photographing screen.

In an example, the first screen may be a video shooting screen, and the first control may be a control, for indicating to shoot a video, on the video shooting screen.

In an example, the first screen may be a video call screen, and the first control may be a control, for indicating to make a video call, on the video call screen.

Step S320: Detect a first operation on the first control.

Optionally, when the first control is a control for indicating to take a photograph, the first operation may be a tap operation on the control for indicating to take a photograph.

Optionally, when the first control is a control for indicating to shoot a video, the first operation may be a tap operation on the control for indicating to shoot a video.

Optionally, when the first control is a control for indicating to make a video call, the first operation may be a tap operation on the control for indicating to make a video call.

It should be understood that the foregoing description uses an example in which the first operation is a tap operation. The first operation may further include a voice indication operation or another operation that indicates the electronic device to take a photograph or make a video call. The foregoing describes an example and does not constitute any limitation on this application.

In this embodiment of this application, before detecting the first operation by a user on the first control, the electronic device may enable a high-dynamic range image shooting mode. For example, the electronic device may enable the high-dynamic range image shooting mode based on a detected second operation. Alternatively, the electronic device may autonomously determine, based on a dynamic range (dynamic range, DR) value of an obtained preview image, whether to enable the high-dynamic range image shooting mode.

In an example, the electronic device detects a second operation, where the second operation is used to indicate enabling the high-dynamic range image shooting mode of the electronic device, and in response to the second operation, the electronic device enables the high-dynamic range image shooting mode.

In an example, the electronic device may obtain a preview image, and determine a first value based on the preview image, where the first value may be a DR value of the preview image, and the DR value may be used to indicate a proportion of an over-exposure region in the preview image. The electronic device may determine based on the DR value of the preview image to enable the high-dynamic range image shooting mode.

For example, when the DR value of the preview image is greater than a preset DR value, the electronic device may enable the high-dynamic range image shooting mode.

For example, as shown in FIG. 2, a camera device may include an automatic exposure (automatic exposure, AE) module. The automatic exposure module may determine the DR value of the preview image based on the preview image. A hardware abstraction layer 230 may include a decision module, and the decision module may determine an image processing algorithm for sampling based on the DR value of the preview image and the like. For example, an image sensor may obtain a preview image, and the automatic exposure module may determine a DR value of the preview image. When the DR value of the preview image is greater than the preset DR value, the decision module may determine to use the image processing method provided in this embodiment of this application for image processing.

It should be understood that for an 8-bit image, an over-exposure region in the image may be a region with a pixel value greater than 255.

Step S330: Obtain a first image sequence in response to the first operation.

The first image sequence may include a first long-exposure image, a first medium-exposure image, and a first short-exposure image.

It should be understood that the first image sequence may be a sequence of images with different exposure times collected by an image sensor of the electronic device.

For example, the first image sequence may include six frames of medium-exposure image, two frames of short-exposure image, and one frame of long-exposure image.

It should be understood that a medium-exposure image may be an image whose exposure value is a standard exposure value (for example, EV0). A long-exposure image may be an image whose exposure value is greater than the standard exposure value. Because an exposure time of the long-exposure image is longer than an exposure time of the medium-exposure image, the electronic device has relatively large light intake when obtaining the long-exposure image, and a dark light region of the medium-exposure image may be improved by using the long-exposure image. A short-exposure image may be an image whose exposure value is less than the standard exposure value. Because an exposure time of the short-exposure image is shorter than an exposure time of the medium-exposure image, the electronic device has relatively small light intake when obtaining the short-exposure image, and detail information of an over-exposure region of the medium-exposure image may be improved by using the short-exposure image.

Step S340: Perform preprocessing on the first image sequence to obtain a second image sequence.

The preprocessing is used to select images in the first image sequence that meet a preset condition, and the second image sequence includes a second medium-exposure image and a second short-exposure image.

Optionally, the second medium-exposure image may be part or all of the first medium-exposure images included in the first image sequence, and the second short-exposure image may be part or all of the first short-exposure images included in the first image sequence.

For example, if the image in the first short-exposure image meets the preset condition, the second short-exposure image is the first short-exposure image.

For example, if part of the first short-exposure images meets the preset condition, the image that meets the preset condition in the first short-exposure images is the second short-exposure image.

Optionally, the preset condition may include a first preset condition, the first preset condition is that an exposure value of an image in the first image sequence is a preset exposure value, and the performing preprocessing on the first image sequence to obtain a second image sequence includes:

selecting first target exposure images in the first image sequence that meet the first preset condition, where the first target exposure images include at least two frames of image; and obtaining the second image sequence based on the first target exposure images.

In this embodiment of this application, the preset condition may include the first preset condition. Based on the first preset condition, first target exposure images with an exposure value equal to the preset exposure value may be determined from the first image sequence, and the second image sequence may be obtained based on the first target exposure images.

Optionally, the preset exposure value may include a first preset exposure value and/or a second preset exposure value, the first preset exposure value may be a preset exposure value of the first long-exposure image, and the second preset exposure value may be a preset exposure value of the first short-exposure image.

For example, the preset exposure value may include the first preset exposure value and the second preset exposure value, or the preset exposure value may include the first preset exposure value, or the preset exposure value may include the second preset exposure value.

In an example, the preset exposure value may include the first preset exposure value (for example, EV2) and the second preset exposure value (for example, EV-2). The first image sequence includes five frames of medium-exposure image, three frames of short-exposure image, and two frames of long-exposure image. An exposure value of the first frame of short-exposure image in the three frames of short-exposure image is EV-2, an exposure value of the second frame of short-exposure image is EV-3, and an exposure value of the third frame of short-exposure image is EV-2. Based on the second preset exposure value EV-2, the first frame of short-exposure image and the third frame of short-exposure image may be selected from the three frames of short-exposure image. The first frame of short-exposure image and the third frame of short-exposure image are retained, but the second frame of short-exposure image is not retained. Similarly, an exposure value of the first frame of long-exposure image in the two frames of long-exposure image is EV3, and an exposure value of the second frame of long-exposure image is EV2. Based on the first preset exposure value EV2, the second frame of long-exposure image may be selected from the two frames of long-exposure image. Therefore, exposure value-based selection is performed on the image sequence based on the first preset condition to obtain the first target exposure images. The first target exposure images may include five frames of medium-exposure image, two frames of short-exposure image, and one frame of long-exposure image.

It should be understood that the foregoing description uses an example in which the image sequence includes five frames of medium-exposure image, three frames of short-exposure image, and two frames of long-exposure image, the first preset exposure value is EV2, and the second preset exposure value is EV-2. A quantity of medium-exposure images, short-exposure images, and long-exposure images included in the image sequence is not limited in this embodiment of this application. The first preset exposure value and the second preset exposure value are not limited as well.

For example, the first preset exposure value and the second preset exposure value may be preset values, or the first preset exposure value and the second preset exposure value may be preset exposure value ranges. For example, the first preset exposure value may be EV4 or the like, or the first preset exposure value may be EV0-EV4. The second preset exposure value may be EV-4 or EV-6, or the second preset exposure value may be EV-6-EV0.

Optionally, the preset exposure value may further include a third preset exposure value, and the third preset exposure value may be a preset exposure value of the medium-exposure image.

In an example, the preset exposure value may include the first preset exposure value, the second preset exposure value, and the third preset exposure value.

For example, the first image sequence may include five frames of medium-exposure image, three frames of short-exposure image, and two frames of long-exposure image. Selection on the two frames of long-exposure image, five frames of medium-exposure image, and three frames of short-exposure image may be performed based on the first preset exposure value, the second preset exposure value, and the third preset exposure value, respectively. Exposure images with an exposure value equal to the preset exposure value are retained, so as to obtain the first target exposure images.

Optionally, in a possible implementation, the preset condition further includes a second preset condition, the second preset condition is that a proportion of same image content as the reference image is a preset proportion value, and the obtaining the second image sequence based on the first target exposure images includes:

comparing the first target exposure images with the reference image to obtain a proportion value, where the proportion value is used to indicate a proportion of same image content as the reference image; selecting, based on the proportion value, second target exposure images in the first target exposure images that meet the second preset condition; and forming the second image sequence by the second target exposure images.

Optionally, the reference image may be any frame of image in the first medium-exposure image. For example, the reference image may be the first frame of image in the first medium-exposure image, or the reference image may be the third frame of image in the first medium-exposure image.

For example, the first image sequence may include six frames of medium-exposure image, two frames of short-exposure image, and one frame of long-exposure image. Based on the first preset condition, four frames of medium-exposure image, one frame of short-exposure image, and one frame of long-exposure image may be determined as the first target exposure images. It is assumed that the second preset condition is that the preset proportion value of the proportion of same image content between an image and the reference image is 80%. A proportion of same image content as the reference image in each frame of image in the four frames of medium-exposure image, one frame of short-exposure image, and one frame of long-exposure image is determined. Images with the proportion of same image content greater than or equal to the preset proportion value are retained to obtain the second target exposure images. For example, in the four frames of medium-exposure image, proportion values of a first medium-exposure image, a second medium-exposure image, a third medium-exposure image, and a fourth medium-exposure image are 90%, 70%, 82%, and 75%, respectively. Based on the preset proportion value of 80% in the second preset condition, the first medium-exposure image and the third medium-exposure image may be retained from the four frames of medium-exposure image. In the two frames of short-exposure image, pixel proportion values of a first short-exposure image and a second short-exposure image are 82% and 83%, respectively. Therefore, the two frames of short-exposure image are retained. A pixel proportion value of the one frame of long-exposure image is 83%. Therefore, the one frame of long-exposure image is retained. The first medium-exposure image, the third medium-exposure image, the two frames of short-exposure image, and the one frame of long-exposure image form the second image sequence.

For example, as shown in FIG. 5, (a) of FIG. 5 indicates image content of the reference image, (b) of FIG. 5 indicates image content of the first frame of medium-exposure image, and (c) of FIG. 5 indicates image content of the second frame of medium-exposure image. It can be seen from (a) of FIG. 5 and (b) of FIG. 5 that (for example, a photographed object corresponding to content of section a moves during shooting) same image content as the reference image in the first frame of medium-exposure image is a second column pixel position to a tenth column pixel position. That is, a proportion of same image content between the first frame of medium-exposure image and the reference image is 90%. Similarly, it can be seen from (a) of FIG. 5 and (c) of FIG. 5 that (for example, a photographed object corresponding to content of sections a, b, and c moves during shooting) same image content as the reference image in the second frame of medium-exposure image is a fourth column pixel position to the tenth column pixel position. That is, a proportion of same image content between the first frame of medium-exposure image and the reference image is 70%.

It should be understood that the foregoing description uses an example in which the image sequence includes six frames of medium-exposure image, two frames of short-exposure image, and one frame of long-exposure image, and the preset proportion value is 80%. A quantity of medium-exposure images, short-exposure images, and long-exposure images included in the image sequence is not limited in this embodiment of this application. The preset proportion value is not limited as well.

Optionally, images that do not meet the preset condition (for example, being not equal to the preset exposure value or less than the preset proportion value) in the first image sequence may not be retained. For example, a pixel of an exposure image that does not meet the preset condition in the first image sequence may be set to zero.

For example, the first image sequence may be a sequence of images with different exposure times collected by an image sensor. For example, the first image sequence may be a sequence of images collected by an image sensor in the electronic device when a high-dynamic range image shooting mode of the electronic device is enabled. Selection on the first image sequence may be performed based on the first preset condition and the second preset condition to obtain the second image sequence. The second image sequence may include a medium-exposure image, or the second image sequence may include a medium-exposure image and a long-exposure image, or the second image sequence may include a medium-exposure image and a short-exposure image, or the second image sequence may include a medium-exposure image, a long-exposure image, and a short-exposure image.

Step S350: Perform fusion processing on the second image sequence to obtain a fused image.

The fused image includes a ghosting region, and the ghosting region is an image region that includes a ghosting artifact in the fused image.

It should be understood that ghosting may refer to an abnormal region that does not exist in a shooting scene but appears in an image of the shooting scene. For example, jitter or movement of a photographed object during shooting causes an excessively large difference between a plurality of frames of image in image content. An abnormal region that does not exist in the shooting scene but appears in a fused image obtained by fusing the plurality of frames of image is a ghosting artifact.

Optionally, the second image sequence may be input into a fusion model to obtain the fused image, where the fusion model is used for fusion processing on the second image sequence.

For example, the fusion model may be a pre-trained convolutional neural network.

Step S360: Process the fused image to obtain a third image.

The third image includes part of the fused image, and the third image does not include the ghosting region.

It should be understood that the third image including part of the fused image may be that the third image has an image region with same image content as the fused image. The third image may be an image obtained by removing the ghosting region from the fused image. For example, the third image may be a high-dynamic range image with ghosting artifacts removed.

It should be noted that when the second image sequence includes a medium-exposure image and a short-exposure image, detail information of an over-exposure region of the medium-exposure image may be improved by using the short-exposure image when fusion processing is performed on the second image sequence. Some large-range ghosting artifacts may not be detected during preprocessing. As a result, a ghosting region is still present in the fused image obtained after fusion processing. In this embodiment of this application, further processing may be performed on the fused image to obtain a high-dynamic range image with ghosting artifacts removed, that is, the third image.

For example, the second image sequence includes the second medium-exposure image and the second short-exposure image, and a photographed object in the second short-exposure image moves in the over-exposure region of a reference image. In this case, a ghosting region may still be present in a fused image after fusion processing is performed on the second image sequence. Further processing may be performed on the fused image to remove ghosting region from the fused image to obtain the third image.

Optionally, the processing the fused image to obtain a third image includes:

performing ghosting detection processing on a reference image and the second short-exposure image in the second image sequence to obtain a mask, where the reference image is any frame of image in the first medium-exposure image in the first image sequence; and processing the fused image based on the mask to obtain the third image.

For example, in this embodiment of this application, the reference image and the second short-exposure image may be compared pixel by pixel to obtain an 8-bit grayscale image. In the grayscale image, a pixel value of a pixel in the reference image that is over-exposed and whose pixel value is greater than that of the short-exposure image is set to 255, where 255 indicates that a confidence of the pixel being a ghosting artifact is 1. Each pixel value in the grayscale image may be used to indicate a degree of confidence of the pixel being a ghosting artifact.

Optionally, the processing the fused image based on the mask to obtain the third image includes:

determining the ghosting region in the fused image based on the mask; and processing the ghosting region according to a hole filling algorithm to obtain the third image.

In this embodiment of this application, the ghosting region in the fused image can be determined based on the mask. The ghosting region may be an image region where the ghosting artifact in the fused image is located. Processing is performed on the ghosting region according to the hole filling algorithm to obtain the third image with ghosting artifacts removed.

It should be understood that the hole filling algorithm is an algorithm that detects a region with information loss in the fused image and fills the region with information loss. For example, the region with information loss may be filled by using a filter.

In this embodiment of this application, the second image sequence that meets the preset condition may be selected from the first image sequence by performing preprocessing on the obtained first image sequence. This can avoid the ghosting region resulting from fusion processing directly performed on the first image sequence. In addition, in this embodiment of this application, after fusion processing is performed on the second image sequence, further processing may be performed on the fused image to obtain the third image with ghosting artifacts removed, so as to ensure that the output high-dynamic range image is a high-dynamic range image with ghosting artifacts removed. Therefore, the image processing method according to this embodiment of this application can be used to remove ghosting artifacts from high-dynamic range images.

The following describes in detail different implementations of the image processing method according to this embodiment of this application with reference to FIG. 6 to FIG. 9.

Implementation 1

Figure 6:
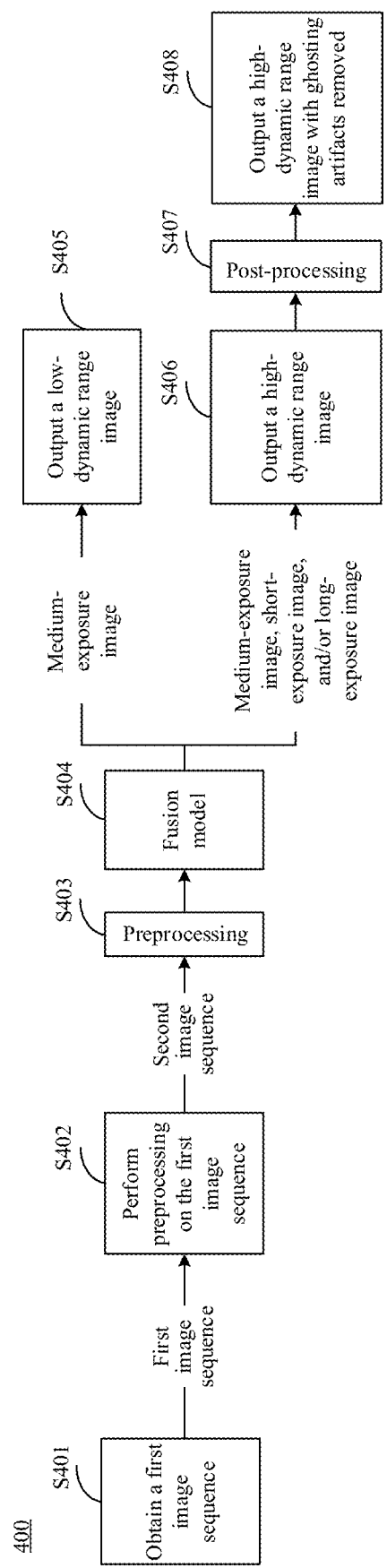
FIG. 6 is a schematic flowchart of an image processing method according to an embodiment of this application.

FIG. 6 is a schematic diagram of an image processing method according to an embodiment of this application.

It should be understood that the image processing method shown in FIG. 6 may be executed by the apparatus shown in FIG. 1. The method 400 shown in FIG. 6 includes step S401 to step S408. The following describes step S401 to step S408 in detail.

Step S401: Obtain a first image sequence.

For example, the first image sequence may be a sequence of images with different exposure times collected by an image sensor. For example, the first image sequence may be a sequence of images collected by an image sensor in the electronic device when a high-dynamic range image shooting mode is enabled.

For example, the first image sequence may include a short-exposure image, a medium-exposure image, and a long-exposure image. For example, the first image sequence includes six frames of medium-exposure image, two frames of short-exposure image, and one frame of long-exposure image.

A medium-exposure image may be an image whose exposure value is a standard exposure value (for example, EV0), a long-exposure image may be an image whose exposure value is greater than the standard exposure value, and a short-exposure image may be an image whose exposure value is less than the standard exposure value.

It should be understood that because an exposure time of the long-exposure image is longer than an exposure time of the medium-exposure image, the electronic device has relatively large light intake when obtaining the long-exposure image, and a dark light region of the medium-exposure image may be improved by using the long-exposure image.

It should be further understood that because an exposure time of the short-exposure image is shorter than the exposure time of the medium-exposure image, the electronic device has relatively small light intake during shooting when obtaining the short-exposure image, and detail information of an over-exposure region of the medium-exposure image may be improved by using the short-exposure image.

Step S402: Perform preprocessing on the first image sequence.

Optionally, the preprocessing may include exposure value-based selection and/or frame difference-based selection on the first image sequence.

In exposure value-based selection, selection on a plurality of frames of image in the first image sequence may be performed based on a preset long-exposure value and/or a preset short-exposure value. In frame difference-based selection, the long-exposure image, medium-exposure image, and short-exposure image may each be compared with a reference image to select images with a large proportion of same pixels as the reference image.

Example 1

Optionally, exposure value-based selection may be performed on the first image sequence based on a preset exposure value to obtain the second image sequence.

For example, the preset exposure value may include a preset long-exposure value and a preset short-exposure value, or the preset exposure value may include a preset short-exposure value, or the preset exposure value may include a preset long-exposure value.

In an example, the preset exposure value may include a preset long-exposure value and a preset short-exposure value.

For example, it is assumed that the preset exposure value includes a preset long-exposure value EV2 and a preset short-exposure value EV-2. The first image sequence includes five frames of medium-exposure image, three frames of short-exposure image, and two frames of long-exposure image. An exposure value of the first frame of short-exposure image in the three frames of short-exposure image is EV-2, an exposure value of the second frame of short-exposure image is EV-3, and an exposure value of the third frame of short-exposure image is EV-2. Based on the preset short-exposure value EV-2, the first frame of short-exposure image and the third frame of short-exposure image may be selected from the three frames of short-exposure image. The first frame of short-exposure image and the third frame of short-exposure image are retained, but the second frame of short-exposure image is not retained. Similarly, an exposure value of the first frame of long-exposure image in the two frames of long-exposure image is EV3, and an exposure value of the second frame of long-exposure image is EV2. Based on the preset long-exposure value EV2, the second frame of long-exposure image may be selected from the two frames of long-exposure image. Therefore, exposure value-based selection is performed on the image sequence based on the preset exposure value. An obtained target image sequence includes five frames of medium-exposure image, two frames of short-exposure image, and one frame of long-exposure image.

It should be understood that the foregoing description uses an example in which the image sequence includes five frames of medium-exposure image, three frames of short-exposure image, and two frames of long-exposure image, the preset long-exposure value is EV2, and the preset short-exposure value is EV-2. A quantity of medium-exposure images, short-exposure images, and long-exposure images included in the image sequence is not limited in this embodiment of this application. The preset short-exposure value and the preset long-exposure value are not limited as well.

For example, the preset long-exposure value and the preset short-exposure value may be preset values, or the preset long-exposure value and the preset short-exposure value may be preset exposure value ranges. For example, the preset long-exposure value may be EV4 or the like, or the preset long-exposure value may be EV0-EV4. The preset short-exposure value may be EV-4 or EV-6, or the preset short-exposure value may be EV-6-EV0.

Optionally, when the preset long-exposure value or the preset short-exposure value is a preset range, when exposure value-based selection is performed on the first image sequence, long-exposure images whose exposure value is within the preset range may be selected from the first image sequence, or short-exposure images whose exposure value is within the preset range may be selected from the first image sequence.

Optionally, the preset exposure value may further include a preset medium-exposure value, and the preset medium-exposure value may be a preset exposure value of the medium-exposure image.

In an example, the preset exposure value includes a preset long-exposure value, a preset medium-exposure value, and a preset short-exposure value. The image sequence includes five frames of medium-exposure image, three frames of short-exposure image, and two frames of long-exposure image. Selection on the two frames of long-exposure image, three frames of short-exposure image, and five frames of medium-exposure image may be performed based on the preset long-exposure value, the preset short-exposure value, and the preset medium-exposure value, respectively. Exposure images with an exposure value that meets (for example, is equal to) the preset exposure value are retained, while exposure images with an exposure value that does not meet the preset exposure value are not retained. For example, a pixel of an exposure image that does not meet (for example, is not equal to) the preset exposure value may be set to 0.

It should be understood that through exposure value-based selection, preliminary selection on the plurality of frames of exposure image included in the first image sequence may be performed to delete exposure images whose exposure values are not equal to the preset exposure value. This avoids an excessively large difference in image content between a plurality of frames of image during fusing of the plurality of frames of image, thereby avoiding ghosting artifacts in a high-dynamic range image obtained by fusing the plurality of frames of image.

Example 2

For example, frame difference-based selection is performed on the first image sequence to obtain the second image sequence. Frame difference-based selection means comparing a long-exposure image, medium-exposure image, or short-exposure image with the reference image to retain images with a large proportion of same pixels as the reference image.

Optionally, the reference image may be the first frame of medium-exposure image in a plurality of frames of medium-exposure image included in the first image sequence; or, the reference image may be the third frame of medium-exposure image in the plurality of frames of medium-exposure image included in the first image sequence; or, the reference image may be any frame of medium-exposure image in the plurality of frames of medium-exposure image included in the first image sequence.

In an example, the first image sequence may include six frames of medium-exposure image, two frames of short-exposure image, and one frame of long-exposure image. The first frame of medium-exposure image in the six frames of medium-exposure image is used as the reference image. The second frame of medium-exposure image to a sixth frame of medium-exposure image in the six frames of medium-exposure image, the two frames of short-exposure image, and the one frame of long-exposure image are each compared with the reference image pixel by pixel to determine a proportion of same image content as the reference image in each frame of image. If the proportion of same image content is greater than or equal to a preset proportion value, the frame of exposure image is retained; or if the proportion of same image content is less than the preset proportion value, the frame of exposure image is not retained.

For example, it is assumed that the preset proportion value is 80%. The first image sequence includes six frames of medium-exposure image, two frames of short-exposure image, and one frame of long-exposure image. The first frame of medium-exposure image is used as the reference image. After the second frame of medium-exposure image is compared with the reference image pixel by pixel, a proportion value of same image content as the reference image in the second frame of medium-exposure image being 90% is obtained. 90% is greater than the preset proportion value 80%, and therefore, the second frame of medium-exposure image is retained. After the third frame of medium-exposure image is compared with the reference image pixel by pixel, a proportion value of same image content as the reference image in the third frame of medium-exposure image being 70% is obtained. 75% is less than the preset proportion value 80%, and therefore, the third frame of medium-exposure image is not retained. Similarly, the fourth frame of medium-exposure image, the fifth frame of medium-exposure image, and the sixth frame of medium-exposure image are each compared with the reference image. Similarly, the two frames of short-exposure image and one frame of long-exposure image are each compared with the reference image. Exposure images that meet the preset proportion value in the first image sequence are retained to obtain the second image sequence.

For example, as shown in FIG. 5, (a) of FIG. 5 indicates image content of the reference image, (b) of FIG. 5 indicates image content of the second frame of medium-exposure image, and (c) of FIG. 5 indicates image content of the third frame of medium-exposure image. It can be seen from (a) of FIG. 5 and (b) of FIG. 5 that (for example, a photographed object corresponding to content of section a moves during shooting) same image content as the reference image in the second frame of medium-exposure image is a second column pixel position to a tenth column pixel position. That is, a proportion of same image content between the second frame of medium-exposure image and the reference image is 90%. Similarly, it can be seen from (a) of FIG. 5 and (c) of FIG. 5 that (for example, a photographed object corresponding to content of sections a, b, and c moves during shooting) same image content as the reference image in the third frame of medium-exposure image is a fourth column pixel position to the tenth column pixel position. That is, a proportion of same image content between the third frame of medium-exposure image and the reference image is 70%.

It should be understood that the foregoing description uses an example in which the first image sequence includes six frames of medium-exposure image, three frames of short-exposure image, and two frames of long-exposure image, and the preset proportion value is 80%. A quantity of medium-exposure images, short-exposure images, and long-exposure images included in the first image sequence is not limited in this embodiment of this application. The preset proportion value is not limited as well.

Example 3

For example, exposure value-based selection and frame difference-based selection are performed on the first image sequence to obtain the second image sequence.

In an example, it is assumed that the preset exposure value includes a preset long-exposure value EV2 and a preset short-exposure value EV-2. The first image sequence includes five frames of medium-exposure image, three frames of short-exposure image, and two frames of long-exposure image. An exposure value of the first frame of short-exposure image in the three frames of short-exposure image is EV-2, an exposure value of the second frame of short-exposure image is EV-3, and an exposure value of the third frame of short-exposure image is EV-32. Based on the preset short-exposure value EV-2, the first frame of short-exposure image and the third frame of short-exposure image may be selected from the three frames of short-exposure image. The first frame of short-exposure image and the third frame of short-exposure image are retained, but the second frame of short-exposure image is not retained. For example, a pixel of the second frame of short-exposure image may be set to 0. Similarly, an exposure value of the first frame of long-exposure image in the two frames of long-exposure image is EV3, and an exposure value of the second frame of long-exposure image is EV2. Based on the preset long-exposure value EV2, the second frame of long-exposure image may be selected from the two frames of long-exposure image. Therefore, exposure value-based selection is performed on the image sequence based on the preset exposure value. An obtained target image sequence includes five frames of medium-exposure image, two frames of short-exposure image, and one frame of long-exposure image. It is assumed that the preset proportion value is 80%, and the first frame of medium-exposure image in the five frames of medium-exposure image is used as the reference image. The second frame of medium-exposure image to the fifth frame of medium-exposure image are each compared with the reference image. Proportion values of same image content as the reference image in the four frames of medium-exposure image are obtained, which are 81%, 85%, 83%, and 85%, respectively. The two frames of short-exposure image and one frame of long-exposure image are each compared with the reference image. Proportion values of same image content as the reference image are obtained, which are 83%, 79%, and 85%, respectively. Images with proportion values greater than or equal to the preset proportion value 80% are retained to obtain five frames of medium-exposure image, the first frame of short-exposure image, and one frame of long-exposure image. That is, the second image sequence includes five frames of medium-exposure image, the first frame of short-exposure image, and one frame of long-exposure image.

It should be understood that the first image sequence obtained in step S401 may include a medium-exposure image, a long-exposure image, and a short-exposure image. After preprocessing is performed on the first image sequence in step S402, the second image sequence may be obtained. The second image sequence may include a medium-exposure image, or the second image sequence may include a long-exposure image and/or a short-exposure image, and a medium-exposure image.

In an example, after preprocessing is performed on the first image sequence, the obtained second image sequence may include only a medium-exposure image.

It should be understood that after exposure value-based selection and frame difference-based selection are performed on the first image sequence, if both the long-exposure image and short-exposure image in the first image sequence meet neither the preset exposure value nor the preset proportion value, only the medium-exposure image is retained in the first image sequence on which preprocessing is performed. That is, the second image sequence includes only the medium-exposure image.

In an example, after preprocessing is performed on the first image sequence, the obtained second image sequence may include a medium-exposure image and a short-exposure image.

In an example, after preprocessing is performed on the first image sequence, the obtained second image sequence may include a medium-exposure image and a long-exposure image.

In an example, after preprocessing is performed on the first image sequence, the obtained second image sequence may include a medium-exposure image, a long-exposure image, and a short-exposure image.

In an example, after preprocessing is performed on the image sequence, the obtained target image sequence may include a medium-exposure image, a long-exposure image, and a short-exposure image.

Step S403: Perform preprocessing.

For example, preprocessing is performed on the second image sequence to obtain a processed second image sequence.

For example, preprocessing may include at least one of black level correction, auto white balance, or image denoising processing.

Black level correction (black level correction, BLC) is used to perform correction processing on black level, where black level means a video signal level with no brightness output on a calibrated display apparatus. Auto white balance (auto white balance, AWB) is used to enable a camera to restore a white object to white under any color temperature. Under the effect of color temperature, a piece of white paper may be yellow under a low color temperature, and blue under a high color temperature. A purpose of auto white balance is to cause a white object to present white for R=G=B under any color temperature.

For example, a variance stabilizing transform (variance stabilizing transform, VST) algorithm may be used for image denoising processing, where the VST algorithm is an algorithm that converts Gaussian-Poissonian noise into Gaussian noise.

Step S404: Apply a fusion model.

For example, the processed second image sequence is input into a fusion model for fusion processing.

For example, the fusion model may be a pre-trained convolutional neuron network, and the fusion model is used for fusion processing on the inputted second image sequence.

For example, in a process of training the fusion model, different types of training data may be added to make the fusion model autonomously learn to fuse a high-dynamic range image to remove ghosting artifacts.

For example, training data for training the fusion model may include first-type training data and second-type training data. The first-type training data may include a plurality of groups of training data. In the plurality of groups of training data, one group of training data may include six sample images, and the six sample images may include three ghosting-free exposure images and three images with ghosting artifacts. The three ghosting-free exposure images are respectively a ghosting-free long-exposure image, a ghosting-free medium-exposure image, and a ghosting-free short-exposure image. The three images with ghosting artifacts may be exposure images obtained after a ghosting region is added to the three ghosting-free exposure images. A training target of the first-type training data is a ghosting-free high-dynamic range image. The second-type training data may include a plurality of frames of medium-exposure image, and a training target of the second-type training data is a ghosting-free medium-exposure image.

Optionally, if the second image sequence includes only a medium-exposure image, step S405 is performed. If the second image sequence includes at least one of a long-exposure image or short-exposure image and a medium-exposure image, step S406 is performed to output a high-dynamic range image.

For example, in this embodiment of this application, the first image sequence may be a sequence of images with different exposure times collected by an image sensor. For example, the first image sequence may be a sequence of images collected by an image sensor in the electronic device when a high-dynamic range image shooting mode of the electronic device is enabled. The first image sequence is preprocessed to obtain the second image sequence. The second image sequence may include a medium-exposure image, or the second image sequence may include a medium-exposure image and a long-exposure image, or the second image sequence may include a medium-exposure image and a short-exposure image, or the second image sequence may include a medium-exposure image, a long-exposure image, and a short-exposure image.

Example 1

If the second image sequence includes only a medium-exposure image, step S405 is performed.

Step S405: Output a low-dynamic range image.

For example, the fusion model performs fusion processing on the processed second image sequence to output a low-dynamic range image.

It should be understood that when fusing is performed on a plurality of frames of medium-exposure image, ghosting detection is performed. Non-ghosting regions in the plurality of frames of medium-exposure image are fused, and ghosting regions in the plurality of frames of medium-exposure image are not fused. Therefore, the low-dynamic range image output by the fusion model usually does not include ghosting artifacts. Post-processing in step S407 does not need to be performed on the low-dynamic range image output by the fusion model.

Example 2

If the second image sequence includes a medium-exposure image and a long-exposure image, step S406 is performed.

Step S406: Output a high-dynamic range image.

For example, the fusion model performs fusion processing on the processed second image sequence to output a high-dynamic range image.

It should be understood that the long-exposure image is used to improve a dark light region in an image and improve a signal-noise ratio of the dark light region. Before fusing is performed on the long-exposure image and the medium-exposure image, ghosting detection is performed. A ghosting region in the long-exposure image is usually not fused with the medium-exposure image, and a non-ghosting region in the long-exposure image is fused with the medium-exposure image. Therefore, the high-dynamic range image obtained after fusing is performed on the medium-exposure image and the long-exposure image usually does not include ghosting artifacts. Post-processing in step S407 does not need to be performed on the high-dynamic range image output by the fusion model. It should be understood that a ghosting region may be an image region that includes ghosting artifacts. For example, the ghosting region in the long-exposure image is an image region that includes ghosting artifacts in the long-exposure image. A non-ghosting region may be an image region with ghosting artifacts removed in an image.

Example 3

If the second image sequence includes a medium-exposure image, a short-exposure image, and a long-exposure image, or if the second image sequence includes a medium-exposure image and a short-exposure image, step S406 to step S408 are performed.

It should be understood that the short-exposure image is used to improve an over-exposure region in an image and improve detail information of the over-exposure region. Therefore, when fusing is performed on the short-exposure image and medium-exposure image, all regions in the short-exposure image usually need to be fused with the medium-exposure image.

In this embodiment of this application, if some large-range ghosting artifacts, such as ghosting artifacts caused by movement of a photographed object in a short-exposure image in an over-exposure region of the reference image, are detected during preprocessing in step S402, and as a result, the high-dynamic region image output by the fusion model includes ghosting artifacts, post-processing may be performed to remove the ghosting artifacts from the high-dynamic range image.

Step S407: Perform post-processing.

For example, post-processing is performed on the high-dynamic range image.

For example, post-processing may include ghosting detection and hole filling. Ghosting detection is used to compare the short-exposure image and the medium-exposure image to obtain a mask, and hole filling is used for performing, based on the mask, processing on the high-dynamic range image output by the fusion model, so as to obtain a high-dynamic range image with ghosting artifacts removed. Optionally, for a specific process of post-processing, refer to FIG. 7.

It should be understood that because an object moves between a plurality of frames of image, a fused image obtained after fusion is performed on the plurality of frames of image includes a region with information loss. The region with information loss may be referred to as a hole. Hole filling is an algorithm for detecting the region with information loss and filling the region with information loss. For example, the region with information loss may be filled by using a filter. Optionally, the step of hole filling may be omitted based on a specific requirement. That is, hole filling is not performed.

Step S408: Output a high-dynamic range image with ghosting artifacts removed.

In this embodiment of this application, exposure images that meet a preset threshold may be determined from the first image sequence by performing preprocessing on the obtained first image sequence. This can avoid the ghosting region resulting from fusion processing directly performed on the first image sequence. In addition, in this embodiment of this application, when the image sequence input into the fusion model includes a short-exposure image, further processing may be performed on the first fused image output by the fusion model, so as to ensure that the output high-dynamic range image is a high-dynamic range image with ghosting artifacts removed. Therefore, the image processing method according to this embodiment of this application can be used to remove ghosting artifacts from high-dynamic range images and improve the image quality of high-dynamic range images.

Figure 7:
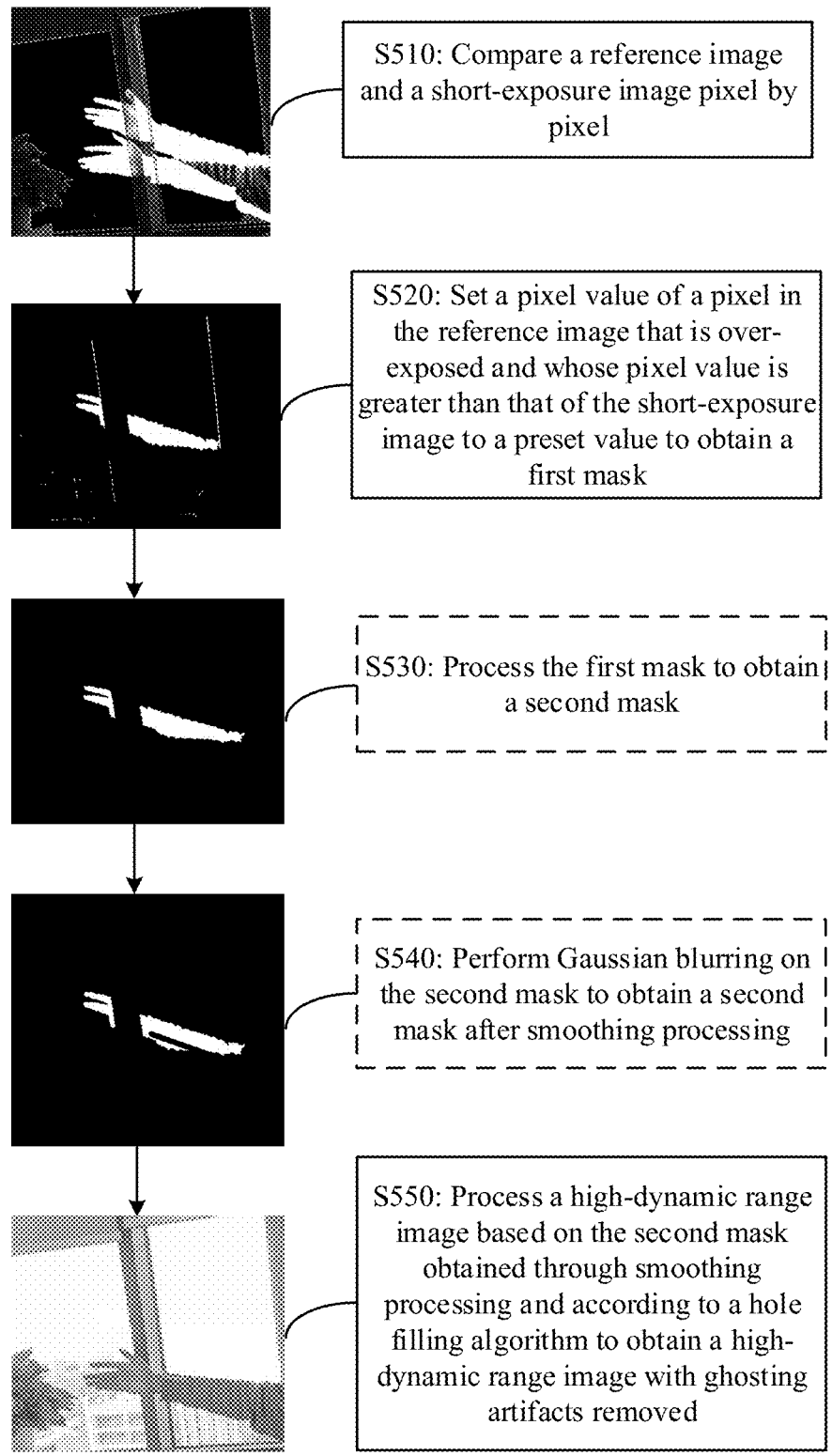
FIG. 7 is a schematic flowchart of post-processing according to an embodiment of this application.

FIG. 7 is a schematic diagram of post-processing performed on a high-dynamic range image output by a fusion model according to an embodiment of this application. The method shown in FIG. 7 includes step S510 to step S550. The following describes step S510 to step S550 in detail.

Step S510: Compare a reference image and a short-exposure image pixel by pixel.

For example, the reference image and the short-exposure image may be compared pixel by pixel to obtain a pixel differential image between the reference image and the short-exposure image.

For example, the reference image may be the first frame of medium-exposure image in a plurality of frames of medium-exposure image included in a first image sequence, and the short-exposure image is a short-exposure image included in a second image sequence.

Step S520: Set a pixel value of a pixel in the reference image that is over-exposed and whose pixel value is greater than that of the short-exposure image to a preset value to obtain a first mask.

In an example, the reference image and the short-exposure image may be compared pixel by pixel to obtain an 8-bit grayscale image. In the grayscale image, a pixel value of a pixel in the reference image that is over-exposed and whose pixel value is greater than that of the short-exposure image is set to 255, where 255 indicates that a confidence of the pixel being a ghosting artifact is 1. Each pixel value in the grayscale image may be used to indicate a degree of confidence of the pixel being a ghosting artifact.

In an example, the reference image and the short-exposure image are compared pixel by pixel to obtain a grayscale image. In the grayscale image, a pixel value of a pixel in the reference image that is over-exposed and whose pixel value is greater than that of the short-exposure image is set to 1. Each pixel value in the grayscale image may be used to indicate a weight of the pixel being a ghosting artifact.

Step S530: Process the first mask to obtain a second mask.

For example, an opening operation may be performed on the first mask to obtain the second mask, where the opening operation means to perform erosion first and then perform dilation. Erosion is similar to median smoothing processing, in which a minimum value within neighborhood of each pixel position is selected. Dilation is similar to erosion in principle. In dilation, a maximum value within neighborhood of each pixel position is selected and used as an output grayscale value.

It should be understood that when fusion processing on the image sequence input into the fusion model, some small-area ghosting regions may be removed. For all ghosting regions included in the first mask, small-area ghosting regions may be removed by performing the opening operation (for example, first erosion operation and then dilation operation) on the first mask and some large-area ghosting regions are retained to obtain the second mask.

Optionally, in order to make an edge region of the second mask smoother, Gaussian blurring processing may be performed on the second mask. That is, step S540 may be performed.

Step S540: Perform Gaussian blurring on the second mask to obtain a second mask after smoothing processing.

Step S550: Process the high-dynamic range image based on the second mask obtained through smoothing processing and according to a hole filling algorithm to obtain a high-dynamic range image with ghosting artifacts removed.

For example, a ghosting region in the high-dynamic range image may be determined based on the second mask obtained through smoothing processing. Box blurring and/or Gaussian blurring is performed on the ghosting region and the hole filling algorithm is used to remove the ghosting region to obtain the high-dynamic range image with ghosting artifacts removed.

It should be understood that because an object moves between a plurality of frames of image, a fused image obtained after fusion is performed on the plurality of frames of image includes a region with information loss. The region with information loss may be referred to as a hole. Hole filling is an algorithm for detecting the region with information loss and filling the region with information loss. For example, the region with information loss may be filled by using a filter. Optionally, in a possible implementation, step S510 and step S520 may be performed. Processing is performed on the high-dynamic range image based on the first mask and the hole filling algorithm to obtain the high-dynamic range image with ghosting artifacts removed.

Optionally, in a possible implementation, step S510 and step S530 may be performed. Processing is performed on the high-dynamic range image based on the second mask and the hole filling algorithm to obtain the high-dynamic range image with ghosting artifacts removed.

It should be understood that the first mask may also be used to determine the ghosting region in the high-dynamic range image. The second mask differs from the first mask in that the first mask includes a large-area ghosting region and a small-area ghosting region, while the second mask includes only a large-area ghosting region.

Implementation 2

In an example, the first image sequence may be obtained, and the first image sequence may include a medium-exposure image, a long-exposure image, and a short-exposure image. Before fusing is performed on the first image sequence, preprocessing may be performed on images in the first image sequence. That is, images that meet a preset condition are selected from the first image sequence to obtain the second image sequence. Fusion processing is performed on the second image sequence to obtain a fused image. The second image sequence may include a medium-exposure image and a short-exposure image. In this embodiment of this application, before fusion processing is performed, selection on short-exposure images in the first image sequence may be performed to obtain a short-exposure image that meets the preset condition. The short-exposure image is used to improve an over-exposure region in an image and improve detail information of the over-exposure region. Therefore, when fusing is performed on the short-exposure image and medium-exposure image, all regions in the short-exposure image usually need to be fused with the medium-exposure image. Preprocessing in this embodiment of this application may prevent a short-exposure image that has a large image difference from the medium-exposure image in the first image sequence from being used for fusion processing, thereby avoiding a ghosting region problem in the fused image.

Figure 8:
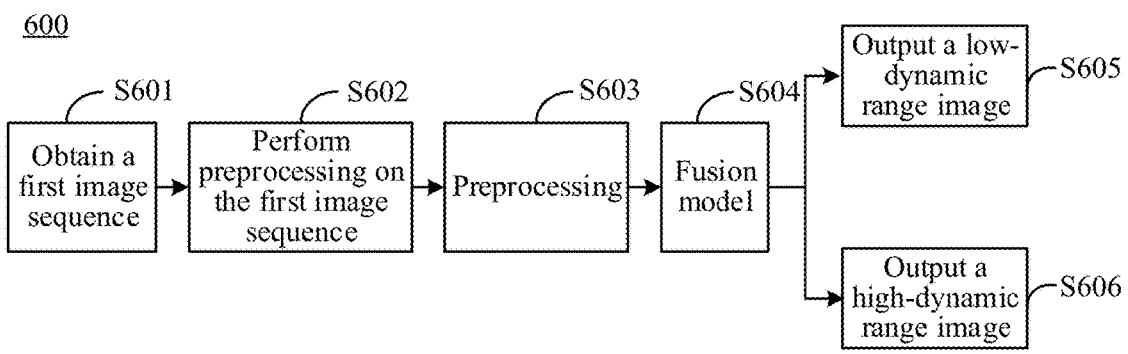
FIG. 8 is a schematic flowchart of an image processing method according to an embodiment of this application.

FIG. 8 is a schematic diagram of an image processing method according to an embodiment of this application. The method 600 shown in FIG. 8 includes step S601 to step S606. The following describes step S601 to step S606 in detail.

Step S601: Obtain a first image sequence.

For example, the first image sequence may be a sequence of images with different exposure times collected by an image sensor. For example, the first image sequence may be a sequence of images collected by an image sensor in an electronic device when a high-dynamic range image shooting mode is enabled.

For example, the first image sequence may include a short-exposure image, a medium-exposure image, and a long-exposure image. For example, the first image sequence includes six frames of medium-exposure image, two frames of short-exposure image, and one frame of long-exposure image.

A medium-exposure image may be an image whose exposure value is a standard exposure value (for example, EV0), a long-exposure image may be an image whose exposure value is greater than the standard exposure value, and a short-exposure image may be an image whose exposure value is less than the standard exposure value.

It should be understood that because an exposure time of the long-exposure image is longer than an exposure time of the medium-exposure image, the electronic device has relatively large light intake when obtaining the long-exposure image, and a dark light region of the medium-exposure image may be improved by using the long-exposure image.

It should be further understood that because an exposure time of the short-exposure image is shorter than the exposure time of the medium-exposure image, the electronic device has relatively small light intake when obtaining the short-exposure image, and detail information of an overexposure region of the medium-exposure image may be improved by using the short-exposure image.

Step S602: Perform preprocessing on the first image sequence.

Optionally, the preprocessing may include exposure value-based selection and/or frame difference-based selection on the first image sequence.

In exposure value-based selection, selection on a plurality of frames of image in the first image sequence may be performed based on a preset long-exposure value and/or a preset short-exposure value. In frame difference-based selection, the long-exposure image, medium-exposure image, and short-exposure image are each compared with a reference image to select images with a large proportion of same pixels as the reference image.

Example 1

Optionally, exposure value-based selection may be performed on the first image sequence based on a preset exposure value to obtain the second image sequence.

For example, the preset exposure value may include a preset long-exposure value and a preset short-exposure value, or the preset exposure value may include a preset short-exposure value, or the preset exposure value may include a preset long-exposure value.

In an example, the preset exposure value may include a preset long-exposure value and a preset short-exposure value.

For example, it is assumed that the preset exposure value includes a preset long-exposure value EV2 and a preset short-exposure value EV-2. The first image sequence includes five frames of medium-exposure image, three frames of short-exposure image, and two frames of long-exposure image. An exposure value of the first frame of short-exposure image in the three frames of short-exposure image is EV-2, an exposure value of the second frame of short-exposure image is EV-3, and an exposure value of the third frame of short-exposure image is EV-2. Based on the preset short-exposure value EV-2, the first frame of short-exposure image and the third frame of short-exposure image may be selected from the three frames of short-exposure image. The first frame of short-exposure image and the third frame of short-exposure image are retained, but the second frame of short-exposure image is not retained. Similarly, an exposure value of the first frame of long-exposure image in the two frames of long-exposure image is EV3, and an exposure value of the second frame of long-exposure image is EV2. Based on the preset long-exposure value EV2, the second frame of long-exposure image may be selected from the two frames of long-exposure image. Therefore, exposure value-based selection is performed on the image sequence based on the preset exposure value. An obtained target image sequence includes five frames of medium-exposure image, two frames of short-exposure image, and one frame of long-exposure image.

It should be understood that the foregoing description uses an example in which the image sequence includes five frames of medium-exposure image, three frames of short-exposure image, and two frames of long-exposure image, the preset long-exposure value is EV2, and the preset short-exposure value is EV-2. A quantity of medium-exposure images, short-exposure images, and long-exposure images included in the image sequence is not limited in this embodiment of this application. The preset short-exposure value and the preset long-exposure value are not limited as well.

For example, the preset long-exposure value and the preset short-exposure value may be preset values, or the preset long-exposure value and the preset short-exposure value may be preset exposure value ranges. For example, the preset long-exposure value may be EV4 or the like, or the preset long-exposure value may be EV0-EV4. The preset short-exposure value may be EV-4 or EV-6, or the preset short-exposure value may be EV-6-EV0.

Optionally, when the preset long-exposure value or the preset short-exposure value is a preset range, when exposure value-based selection is performed on the first image sequence, long-exposure images whose exposure value is within the preset range may be selected from the first image sequence, or short-exposure images whose exposure value is within the preset range may be selected from the first image sequence.

Optionally, the preset exposure value may further include a preset medium-exposure value, and the preset medium-exposure value may be a preset exposure value of the medium-exposure image.

In an example, the preset exposure value includes a preset long-exposure value, a preset medium-exposure value, and a preset short-exposure value. The image sequence includes five frames of medium-exposure image, three frames of short-exposure image, and two frames of long-exposure image. Selection on the two frames of long-exposure image, three frames of short-exposure image, and five frames of medium-exposure image may be performed based on the preset long-exposure value, the preset short-exposure value, and the preset medium-exposure value, respectively. Exposure images with an exposure value that meets (for example, is equal to) the preset exposure value are retained, while exposure images with an exposure value that does not meet the preset exposure value are not retained. For example, a pixel of an exposure image that does not meet (for example, is not equal to) the preset exposure value may be set to 0.

It should be understood that through exposure value-based selection, preliminary selection on the plurality of frames of exposure image included in the first image sequence may be performed to delete exposure images whose exposure values are not equal to the preset exposure value. This avoids an excessively large difference in image content between a plurality of frames of image during fusing of the plurality of frames of image, thereby avoiding ghosting artifacts in a high-dynamic range image obtained by fusing the plurality of frames of image.

Example 2

For example, frame difference-based selection is performed on the first image sequence to obtain the second image sequence. Frame difference-based selection means comparing a long-exposure image, medium-exposure image, or short-exposure image with the reference image to retain images with a large proportion of same pixels as the reference image.

Optionally, the reference image may be the first frame of medium-exposure image in a plurality of frames of medium-exposure image included in the first image sequence; or, the reference image may be the third frame of medium-exposure image in the plurality of frames of medium-exposure image included in the first image sequence; or, the reference image may be any frame of medium-exposure image in the plurality of frames of medium-exposure image included in the first image sequence.

In an example, the first image sequence may include six frames of medium-exposure image, two frames of short-exposure image, and one frame of long-exposure image. The first frame of medium-exposure image in the six frames of medium-exposure image is used as the reference image. The second frame of medium-exposure image to a sixth frame of medium-exposure image in the six frames of medium-exposure image, the two frames of short-exposure image, and the one frame of long-exposure image are each compared with the reference image pixel by pixel to determine a proportion of same image content as the reference image in each frame of image. If the proportion of same image content is greater than or equal to a preset proportion value, the frame of exposure image is retained; or if the proportion of same image content is less than the preset proportion value, the frame of exposure image is not retained.

For example, it is assumed that the preset proportion value is 80%. The first image sequence includes six frames of medium-exposure image, two frames of short-exposure image, and one frame of long-exposure image. The first frame of medium-exposure image is used as the reference image. After the second frame of medium-exposure image is compared with the reference image pixel by pixel, a proportion value of same image content as the reference image in the second frame of medium-exposure image being 90% is obtained. 90% is greater than the preset proportion value 80%, and therefore, the second frame of medium-exposure image is retained. After the third frame of medium-exposure image is compared with the reference image pixel by pixel, a proportion value of same image content as the reference image in the third frame of medium-exposure image being 70% is obtained. 75% is less than the preset proportion value 80%, and therefore, the third frame of medium-exposure image is not retained. Similarly, the fourth frame of medium-exposure image, the fifth frame of medium-exposure image, and the sixth frame of medium-exposure image are each compared with the reference image. Similarly, the two frames of short-exposure image and one frame of long-exposure image are each compared with the reference image. Exposure images that meet the preset proportion value in the first image sequence are retained to obtain the second image sequence.

For example, as shown in FIG. 5, (a) of FIG. 5 indicates image content of the reference image, (b) of FIG. 5 indicates image content of the second frame of medium-exposure image, and (c) of FIG. 5 indicates image content of the third frame of medium-exposure image. It can be seen from (a) of FIG. 5 and (b) of FIG. 5 that (for example, a photographed object corresponding to content of section a moves during shooting) same image content as the reference image in the second frame of medium-exposure image is a second column pixel position to a tenth column pixel position. That is, a proportion of same image content between the second frame of medium-exposure image and the reference image is 90%. Similarly, it can be seen from (a) of FIG. 5 and (c) of FIG. 5 that (for example, a photographed object corresponding to content of sections a, b, and c moves during shooting) same image content as the reference image in the third frame of medium-exposure image is a fourth column pixel position to the tenth column pixel position. That is, a proportion of same image content between the third frame of medium-exposure image and the reference image is 70%.

It should be understood that the foregoing description uses an example in which the first image sequence includes six frames of medium-exposure image, three frames of short-exposure image, and two frames of long-exposure image, and the preset proportion value is 80%. A quantity of medium-exposure images, short-exposure images, and long-exposure images included in the first image sequence is not limited in this embodiment of this application. The preset proportion value is not limited as well.

Example 3

For example, exposure value-based selection and frame difference-based selection are performed on the first image sequence to obtain the second image sequence.

In an example, it is assumed that the preset exposure value includes a preset long-exposure value EV2 and a preset short-exposure value EV-2. The first image sequence includes five frames of medium-exposure image, three frames of short-exposure image, and two frames of long-exposure image. An exposure value of the first frame of short-exposure image in the three frames of short-exposure image is EV-2, an exposure value of the second frame of short-exposure image is EV-3, and an exposure value of the third frame of short-exposure image is EV-32. Based on the preset short-exposure value EV-2, the first frame of short-exposure image and the third frame of short-exposure image may be selected from the three frames of short-exposure image. The first frame of short-exposure image and the third frame of short-exposure image are retained, but the second frame of short-exposure image is not retained. For example, a pixel of the second frame of short-exposure image may be set to 0. Similarly, an exposure value of the first frame of long-exposure image in the two frames of long-exposure image is EV3, and an exposure value of the second frame of long-exposure image is EV2. Based on the preset long-exposure value EV2, the second frame of long-exposure image may be selected from the two frames of long-exposure image. Therefore, exposure value-based selection is performed on the image sequence based on the preset exposure value. An obtained target image sequence includes five frames of medium-exposure image, two frames of short-exposure image, and one frame of long-exposure image. It is assumed that the preset proportion value is 80%, and the first frame of medium-exposure image in the five frames of medium-exposure image is used as the reference image. The second frame of medium-exposure image to the fifth frame of medium-exposure image each are compared with the reference image. Proportion values of same image content as the reference image in the four frames of medium-exposure image are obtained, which are 81%, 85%, 83%, and 85%, respectively. The two frames of short-exposure image and one frame of long-exposure image are each compared with the reference image. Proportion values of same image content as the reference image are obtained, which are 83%, 79%, and 85%, respectively. Images with proportion values greater than or equal to the preset proportion value 80% are retained to obtain five frames of medium-exposure image, the first frame of short-exposure image, and one frame of long-exposure image. That is, the second image sequence includes five frames of medium-exposure image, the first frame of short-exposure image, and one frame of long-exposure image.

It should be understood that the first image sequence obtained in step S601 may include a medium-exposure image, a long-exposure image, and a short-exposure image. After preprocessing is performed on the first image sequence in step S602, the second image sequence may be obtained. The second image sequence may include a medium-exposure image, or the second image sequence may include a long-exposure image and/or a short-exposure image, and a medium-exposure image.

In an example, after preprocessing is performed on the first image sequence, the obtained second image sequence may include only a medium-exposure image.

It should be understood that after exposure value-based selection and frame difference-based selection are performed on the first image sequence, if both the long-exposure image and short-exposure image in the first image sequence meet neither the preset exposure value nor the preset proportion value, only the medium-exposure image is retained in the first image sequence on which preprocessing is performed. That is, the second image sequence includes only the medium-exposure image.

In an example, after preprocessing is performed on the first image sequence, the obtained second image sequence may include a medium-exposure image and a short-exposure image.

In an example, after preprocessing is performed on the first image sequence, the obtained second image sequence may include a medium-exposure image and a long-exposure image.

In an example, after preprocessing is performed on the first image sequence, the obtained second image sequence may include a medium-exposure image, a long-exposure image, and a short-exposure image.

In an example, after preprocessing is performed on the image sequence, the obtained target image sequence may include a medium-exposure image, a long-exposure image, and a short-exposure image.

Step S603: Perform preprocessing.

For example, preprocessing is performed on the second image sequence to obtain a processed second image sequence.

For example, preprocessing may include at least one of black level correction, auto white balance, or image denoising processing on the second image sequence.

Black level correction (black level correction, BLC) is used to perform correction processing on black level, where black level means a video signal level with no brightness output on a calibrated display apparatus. Auto white balance (auto white balance, AWB) is used to enable a camera to restore a white object to white under any color temperature. Under the effect of color temperature, a piece of white paper may be yellow under a low color temperature, and blue under a high color temperature. A purpose of auto white balance is to cause a white object to present white for R=G=B under any color temperature.

For example, a variance stabilizing transform (variance stabilizing transform, VST) algorithm may be used for image denoising processing, where the VST algorithm is an algorithm that converts Gaussian-Poissonian noise into Gaussian noise.

Step S604: Apply a fusion model.

For example, the processed second image sequence is input into the fusion model for processing.

For example, in a process of training the fusion model, different types of training data may be added to make the fusion model autonomously learn to fuse a high-dynamic range image to remove ghosting artifacts.

For example, training data for training the fusion model may include first-type training data and second-type training data. The first-type training data may include a plurality of groups of training data. In the plurality of groups of training data, one group of training data may include six sample images, and the six sample images may include three ghosting-free exposure images and three images with ghosting artifacts. The three ghosting-free exposure images are respectively a ghosting-free long-exposure image, a ghosting-free medium-exposure image, and a ghosting-free short-exposure image. The three images with ghosting artifacts may be exposure images obtained after a ghosting region is added to the three ghosting-free exposure images. A training target of the first-type training data is a ghosting-free high-dynamic range image. The second-type training data may include a plurality of frames of medium-exposure image, and a training target of the second-type training data is a ghosting-free medium-exposure image.

Optionally, if the second image sequence includes only a medium-exposure image, step S605 is performed.

Step S605: Output a low-dynamic range image.

For example, the fusion model performs fusion processing on the processed second image sequence to output a low-dynamic range image.

Optionally, if the second image sequence includes only a long-exposure image or short-exposure image and a medium-exposure image, step S606 is performed to output a high-dynamic range image.

Step S606: Output a high-dynamic range image.

For example, the fusion model performs fusion processing on the processed second image sequence to output a high-dynamic range image.

In this embodiment of this application, the first image sequence may be obtained, and the first image sequence may include a medium-exposure image, a long-exposure image, and a short-exposure image. Before fusing is performed on the first image sequence, preprocessing may be performed on images in the first image sequence. That is, images that meet a preset condition are selected from the first image sequence to obtain the second image sequence. Fusion processing is performed on the second image sequence to obtain a fused image. The second image sequence may include a medium-exposure image and a short-exposure image. In this embodiment of this application, before fusion processing is performed, selection on short-exposure images in the first image sequence may be performed to obtain a short-exposure image that meets the preset condition. The short-exposure image is used to improve an over-exposure region in an image and improve detail information of the over-exposure region. Therefore, when fusing is performed on the short-exposure image and medium-exposure image, all regions in the short-exposure image usually need to be fused with the medium-exposure image. Preprocessing in this embodiment of this application may prevent a short-exposure image that has a large image difference from the medium-exposure image in the first image sequence from being used for fusion processing, thereby avoiding a ghosting region problem in the fused image.

Implementation 3

Figure 9:
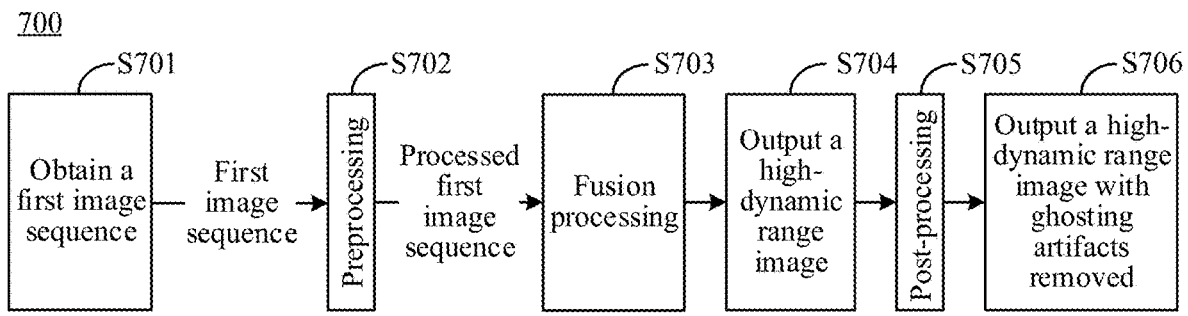
FIG. 9 is a schematic flowchart of an image processing method according to an embodiment of this application.

FIG. 9 is a schematic diagram of an image processing method according to an embodiment of this application. The method 700 shown in FIG. 9 includes step S701 to step S706. The following describes step S701 to step S706 in detail.

Step S701: Obtain a first image sequence.

For example, the first image sequence may be a sequence of images with different exposure times collected by an image sensor. For example, the first image sequence may be a sequence of images collected by an image sensor in an electronic device when a high-dynamic range image shooting mode is enabled.

For example, the first image sequence may include a short-exposure image, a medium-exposure image, and a long-exposure image. For example, the first image sequence includes six frames of medium-exposure image, two frames of short-exposure image, and one frame of long-exposure image.

A medium-exposure image may be an image whose exposure value is a standard exposure value (for example, EV0), a long-exposure image may be an image whose exposure value is greater than the standard exposure value, and a short-exposure image may be an image whose exposure value is less than the standard exposure value.

It should be understood that because an exposure time of the long-exposure image is longer than an exposure time of the medium-exposure image, the electronic device has relatively large light intake when obtaining the long-exposure image, and a dark light region of the medium-exposure image may be improved by using the long-exposure image.

It should be further understood that because an exposure time of the short-exposure image is shorter than the exposure time of the medium-exposure image, the electronic device has relatively small light intake during shooting when obtaining the short-exposure image, and detail information of an over-exposure region of the medium-exposure image may be improved by using the short-exposure image.

Step S702: Perform preprocessing.

For example, preprocessing is performed on the first image sequence to obtain a processed first image sequence.

For example, preprocessing may include at least one of black level correction, auto white balance, or image denoising processing on the first image sequence.

Black level correction (black level correction, BLC) is used to perform correction processing on black level, where black level means a video signal level with no brightness output on a calibrated display apparatus. Auto white balance (auto white balance, AWB) is used to enable a camera to restore a white object to white under any color temperature. Under the effect of color temperature, a piece of white paper may be yellow under a low color temperature, and blue under a high color temperature. A purpose of auto white balance is to cause a white object to present white for R=G=B under any color temperature.

For example, a variance stabilizing transform (variance stabilizing transform, VST) algorithm may be used for image denoising processing, where the VST algorithm is an algorithm that converts Gaussian-Poissonian noise into Gaussian noise.

Step S703: Perform fusion processing.

For example, fusion processing is performed on the processed first image sequence.

Optionally, the processed first image sequence may be input into a fusion model for fusion processing.

For example, in a process of training the fusion model, different types of training data may be added to make the fusion model autonomously learn to fuse a high-dynamic range image to remove ghosting artifacts.

For example, training data for training the fusion model may include first-type training data and second-type training data. The first-type training data may include a plurality of groups of training data. In the plurality of groups of training data, one group of training data may include six sample images, and the six sample images may include three ghosting-free exposure images and three images with ghosting artifacts. The three ghosting-free exposure images are respectively a ghosting-free long-exposure image, a ghosting-free medium-exposure image, and a ghosting-free short-exposure image. The three images with ghosting artifacts may be exposure images obtained after a ghosting region is added to the three ghosting-free exposure images. A training target of the first-type training data is a ghosting-free high-dynamic range image. The second-type training data may include a plurality of frames of medium-exposure image, and a training target of the second-type training data is a ghosting-free medium-exposure image.

Step S704: Output a high-dynamic range image.

Step S705: Perform post-processing.

For example, post-processing is performed on the high-dynamic range image.

For example, post-processing may include ghosting detection and hole filling. Ghosting detection is performed on the short-exposure image and the reference image to obtain a mask, where the reference image may be the first frame of medium-exposure image. Ghosting removal processing is performed, based on the mask and a hole filling algorithm, on the high-dynamic range image output by the fusion model. For a specific process of post-processing, refer to FIG. 7. Details are not described again herein.

Step S706: Output a high-dynamic range image with ghosting artifacts removed.

In this embodiment of this application, further processing may be performed on the fused image output from the fusion model. For example, ghosting detection is performed on the short-exposure image and the reference image to obtain a mask, a ghosting region in the fused image is determined based on the mask, and the ghosting region is processed according to the hole filling algorithm, so as to ensure that the output ghosting region is a high-dynamic range image with ghosting artifacts removed. The image processing method according to this embodiment of this application can be used to remove ghosting artifacts from high-dynamic range images and improve the quality of the high-dynamic range images.

Figure 10:
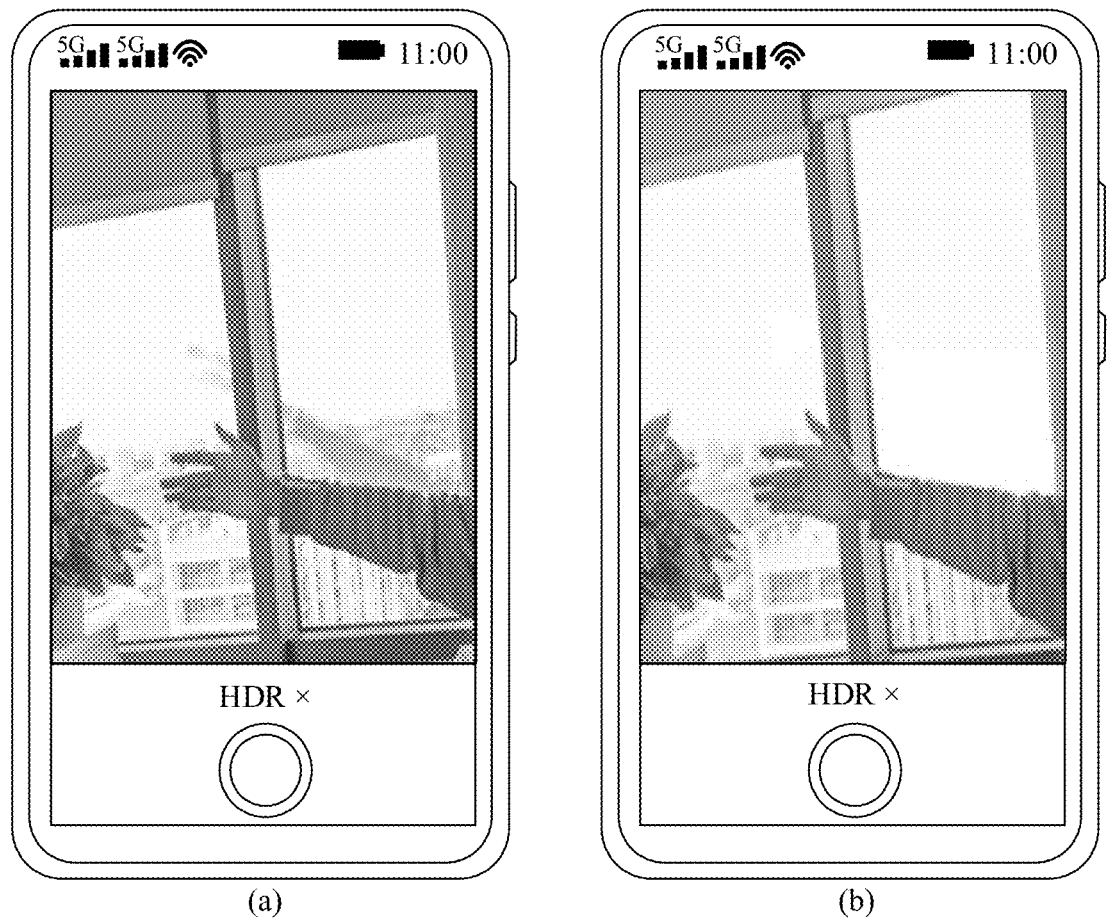
FIG. 10 is a schematic diagram of effects of an image processing method according to an embodiment of this application.

For example, FIG. 10 is a schematic diagram of effects of an image processing method according to an embodiment of this application.

As shown in FIG. 10, (a) of FIG. 10 is a preview image of a high-dynamic range image obtained by using an existing image processing method, and (b) of FIG. 10 is a preview image of a high-dynamic range image obtained by using an image processing method according to this embodiment of this application. It can be seen from the preview image shown in (a) of FIG. 10 that a ghosting region appears in an arm position in the image. Compared with the preview image shown in (a) of FIG. 10, the preview image shown in (b) of FIG. 10 has an obviously reduced ghosting region. Therefore, the image processing method according to this embodiment of this application can be used to effectively remove ghosting artifacts from the high-dynamic range image and improve the quality of the high-dynamic range image.

In an example, an electronic device detects a second operation for indicating to enable a high-dynamic range image shooting mode. In response to the second operation, the electronic device enables the high-dynamic range image shooting mode. After the high-dynamic range image shooting mode is enabled, the electronic device may use the image processing method according to this embodiment of this application to perform image processing on an obtained image sequence to output a high-dynamic range image.

Figure 11:
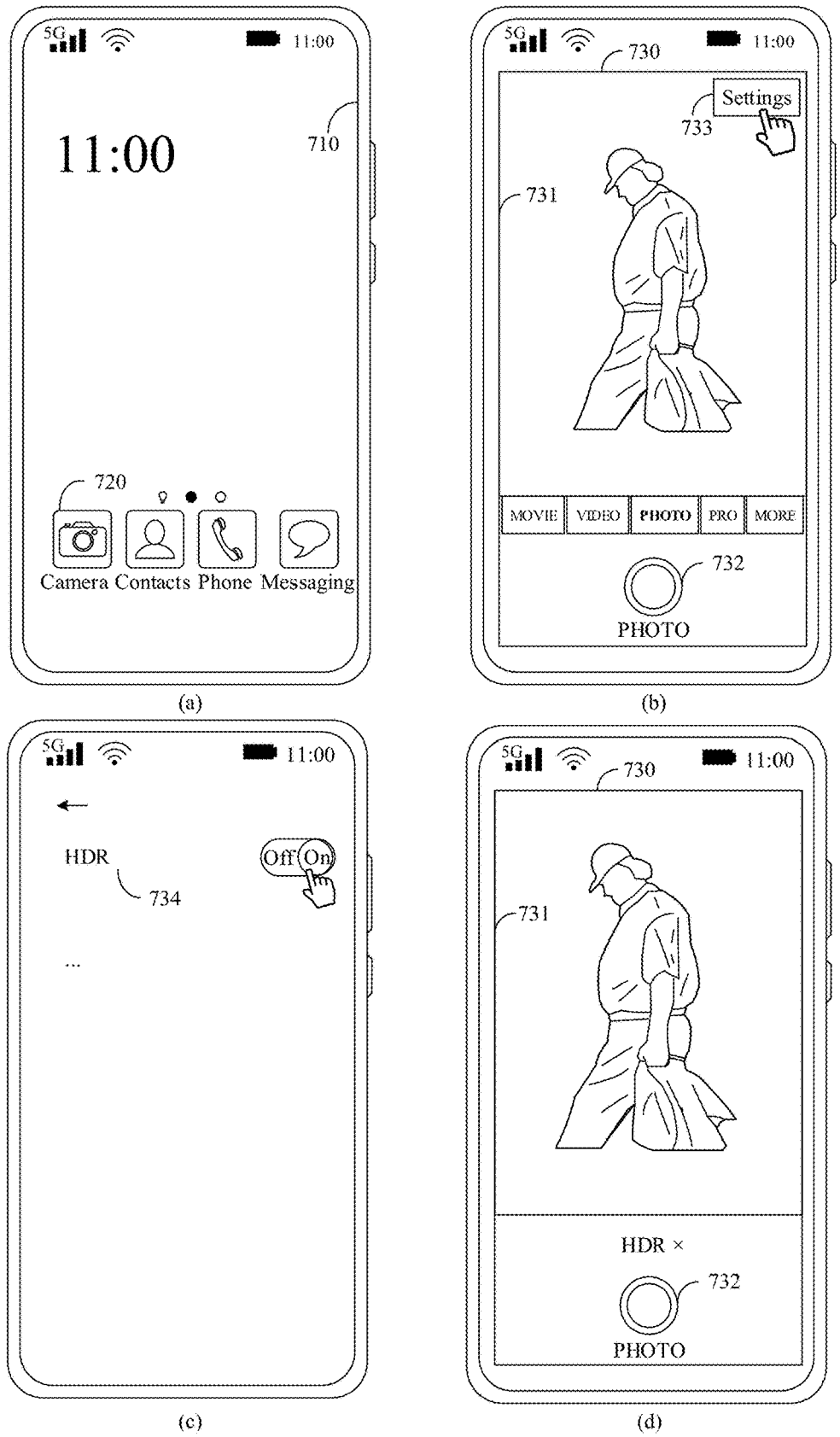
FIG. 11 is a schematic diagram of a graphics user interface to which an embodiment of this application is applicable.

FIG. 11 shows a graphics user interface (graphical user interface, GUI) of an electronic device.

A GUI shown in (a) of FIG. 11 is a desktop 710 of the electronic device. After the electronic device detects a tap operation by a user on an icon 720 of a camera application (application, APP) on the desktop 710, the camera application can be started, and another GUI shown in (b) of FIG. 10 is displayed. The GUI shown in (b) of FIG. 11 may be a display screen of the camera APP in photographing mode and the GUI may include a shooting screen 730. The shooting screen 730 may include a viewfinder frame 731 and a control. For example, the shooting screen 730 may include a control 732 for indicating to take a photograph and a control 733 for indicating settings. In a preview state, the viewfinder frame 731 may display a preview image in real time. The preview state may be after the user turns on the camera but before the user presses a photo/video button. In this case, the viewfinder frame may display a preview image in real time.

After the electronic device detects a tap operation by the user to set the control 733, a setting screen shown in (c) of FIG. 11 is displayed. The setting screen may include an HDR control 734. After detecting a tap operation by the user on the HDR control 734, the electronic device may enable a high-dynamic range image shooting mode. After the electronic device enables the high-dynamic range image shooting mode, a display screen shown in (d) of FIG. 11 may be displayed. After the user taps the control 732 for indicating to take a photograph, an image processing method according to this embodiment of this application is used to process an obtained image sequence to output a high-dynamic range image with ghosting artifacts removed.

In an example, the electronic device may obtain a preview image, and determine a first value based on the preview image, where the first value may be a DR value of the preview image, and the DR value may be used to indicate a proportion of an over-exposure region in the preview image. The electronic device may determine based on the DR value to enable the high-dynamic range image shooting mode. After the high-dynamic range image shooting mode is enabled, the electronic device may use the image processing method according to this embodiment of this application to process an obtained image sequence to output a high-dynamic range image.

Figure 12:
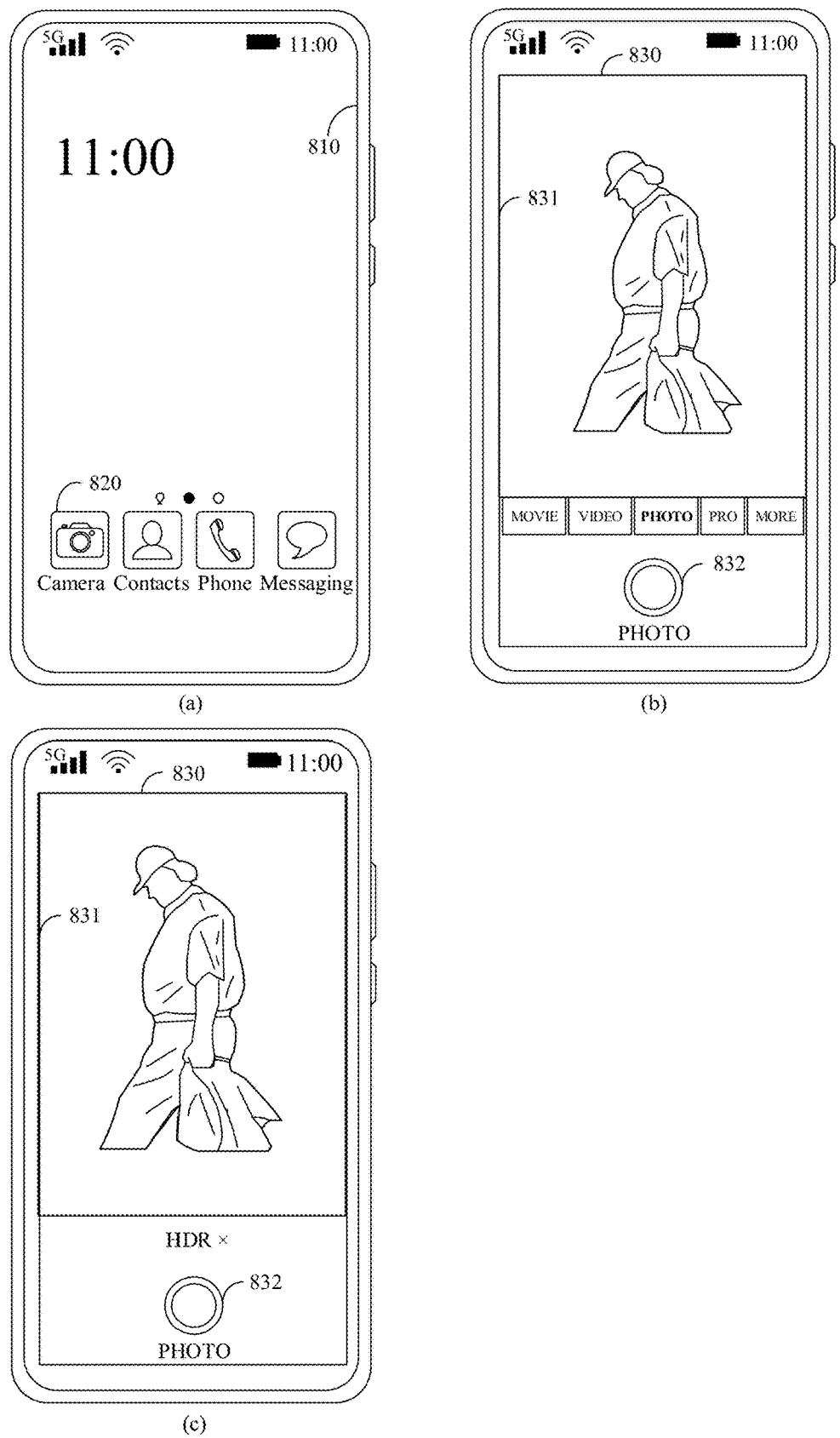
FIG. 12 is a schematic diagram of a graphics user interface to which an embodiment of this application is applicable.

FIG. 12 shows a graphics user interface (graphical user interface, GUI) of an electronic device.

A GUI shown in (a) of FIG. 12 is a desktop 810 of the electronic device. When the electronic device detects a tap operation by a user on an icon 820 of a camera application (application, APP) on the desktop 810, the camera application can be started, and another GUI shown in (b) of FIG. 12 is displayed. The GUI shown in (b) of FIG. 12 may be a display screen of the camera APP in photographing mode and the GUI may include a shooting screen 830. The shooting screen 830 may include a viewfinder frame 831 and a control. For example, the shooting screen 830 may include a control 832 for indicating to take a photograph and other controls. In a preview state, the viewfinder frame 831 may display a preview image in real time. The preview state may be after the user turns on the camera but before the user presses a photo/video button. In this case, the viewfinder frame may display a preview image in real time.

After the electronic device determines based on a DR value of the preview image to enable a high-dynamic range image shooting mode, a display screen shown in (c) of FIG. 12 may be displayed. After a user taps the control 832 for indicating to take a photograph, an image processing method according to this embodiment of this application is used to process an obtained image sequence to output a high-dynamic range image with ghosting artifacts removed.

It should be noted that the foregoing example is intended to help a person skilled in the art understand the embodiments of this application, but not to limit the embodiments of this application to specific values or specific scenarios in the examples. A person skilled in the art may apparently perform various equivalent modifications or variations based on descriptions of the foregoing example, and such modifications or variations shall also fall within the scope of the embodiments of this application.

Figure 13:
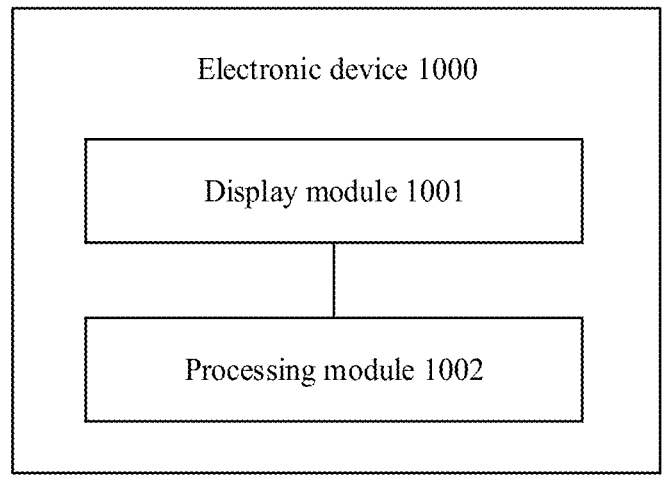
FIG. 13 is a schematic structural diagram of an electronic device to which an embodiment of this application is applicable.
Figure 14:
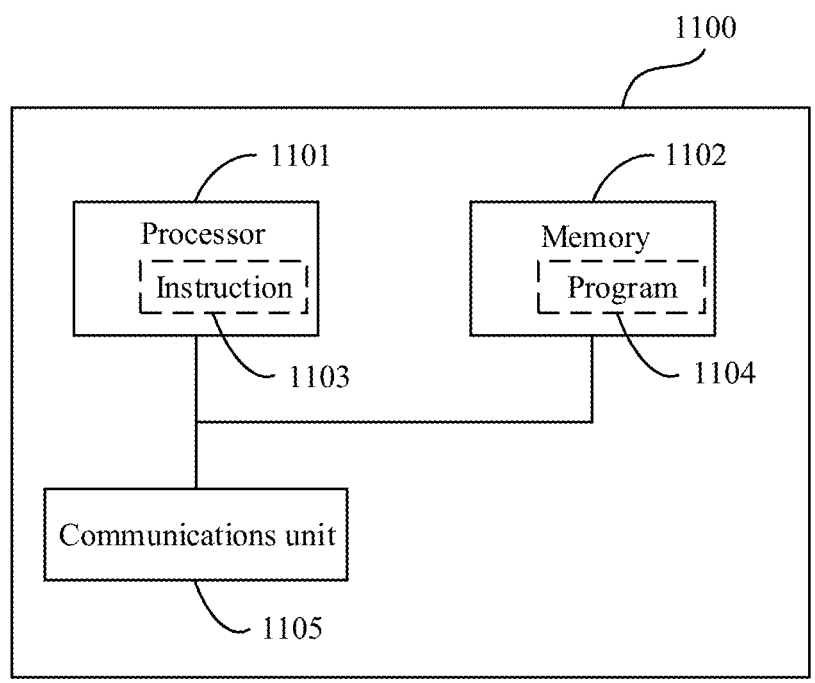
FIG. 14 is a schematic structural diagram of an electronic device to which an embodiment of this application is applicable.

The foregoing has described in detail the image processing method provided in the embodiments of this application with reference to FIG. 1 to FIG. 12, and the following describes in detail the apparatus embodiments of this application with reference to FIG. 13 and FIG. 14. It should be understood that the apparatus in the embodiments of this application can perform the methods in the foregoing embodiments of this application. For specific working processes of the products, refer to corresponding processes in the foregoing method embodiments.

FIG. 13 is a schematic structural diagram of an electronic device according to an embodiment of this application. The electronic device 1000 includes a display module 1001 and a processing module 1002.

The display module 1001 is configured to display a first screen, where the first screen includes a first control. The processing module 1002 is configured to detect a first operation on the first control; obtain a first image sequence in response to the first operation, where the first image sequence includes a first long-exposure image, a first medium-exposure image, and a first short-exposure image; perform preprocessing on the first image sequence to obtain a second image sequence, where the preprocessing is used to select images in the first image sequence that meet a preset condition, and the second image sequence includes a second medium-exposure image and a second short-exposure image; perform fusion processing on the second image sequence to obtain a fused image, where the fused image includes a ghosting region, and the ghosting region is an image region that includes a ghosting artifact in the fused image; and process the fused image to obtain a third image, where the third image includes part of the fused image, and the third image does not include the ghosting region.

Optionally, in an embodiment, the processing module 1002 is specifically configured to:
perform ghosting detection processing on a reference image and the second short-exposure image to obtain a mask, where the reference image is any frame of image in the first medium-exposure image; and
process the fused image based on the mask to obtain the third image.

Optionally, in an embodiment, the processing module 1002 is specifically configured to:
determine the ghosting region in the fused image based on the mask; and
process the ghosting region according to a hole filling algorithm to obtain the third image.

Optionally, in an embodiment, the preset condition includes a first preset condition, and the first preset condition is that an exposure value of an image in the first image sequence is a preset exposure value. The processing module 1002 is specifically configured to:

select first target exposure images in the first image sequence that meet the first preset condition, where the first target exposure images include at least two frames of image; and obtain the second image sequence based on the first target exposure images.

Optionally, in an embodiment, the preset exposure value includes a first preset exposure value and/or a second preset exposure value, the first preset exposure value is a preset exposure value of the first long-exposure image, and the second preset exposure value is a preset exposure value of the first short-exposure image.

Optionally, in an embodiment, the preset condition includes a second preset condition, and the second preset condition is that a proportion of same image content between an image in the first target exposure images and the reference image is a preset proportion value. The processing module 1002 is specifically configured to:

compare the first target exposure images with the reference image to obtain a proportion value, where the proportion value is used to indicate a proportion of same image content as the reference image;

select, based on the proportion value, second target exposure images in the first target exposure images that meet the second preset condition; and form the second image sequence by the second target exposure images.

Optionally, in an embodiment, the processing module 1002 is specifically configured to:

input the second image sequence into a fusion model to obtain the fused image, where the fusion model is used for fusion processing on the second image sequence.

Optionally, in an embodiment, the fusion model is a convolutional neuron network.

Optionally, in an embodiment, the processing module 1002 is further configured to:

detect a second operation, where the second operation is used to indicate enabling a high-dynamic range image shooting mode of the electronic device.

Optionally, in an embodiment, the processing module 1002 is further configured to:

obtain a preview image;

determine a first value based on the preview image, where the first value is used to indicate a proportion of an over-exposure region in the preview image; and determine based on the first value to enable the high-dynamic range image shooting mode of the electronic device.

Optionally, in an embodiment, the first screen is a photographing screen, and the first control is a control for indicating to take a photograph.

Optionally, in an embodiment, the first screen is a video shooting screen, and the first control is a control for indicating to shoot a video.

Optionally, in an embodiment, the first screen is a video call screen, and the first control is a control for indicating to make a video call.

It should be noted that the electronic device 1000 is implemented in a form of a functional module. The term "module" herein may be implemented in the form of software and/or hardware, which is not specifically limited.

For example, a "module" may be a software program, a hardware circuit, or a combination of the two that implements the functions described above. The hardware circuit may include an application-specific integrated circuit (application specific integrated circuit, ASIC), an electronic circuit, a processor configured to execute one or more software or firmware programs (for example, a shared processor, a dedicated processor, or a group processor), and a memory, or a merged logic circuit and/or another appropriate component supporting the described functions.

Therefore, the units in the example described in the embodiments of this application can be implemented by electronic hardware, or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

FIG. 14 is a schematic structural diagram of an electronic device according to this application. A dotted line in FIG. 14 indicates that a unit or module is optional. The electronic device 1100 may be used to implement the image method described in the foregoing method embodiment.

The electronic device 1100 includes one or more processors 1101, and the one or more processors 1101 can support the electronic device 1100 to implement the image processing methods in the method embodiments. The processor 1101 may be a general purpose processor or a special purpose processor. For example, the processor 1101 may be a central processing unit (central processing unit, CPU), a digital signal processor (digital signal processor, DSP), an application specific integrated circuit (application specific integrated circuit, ASIC), a field programmable gate array (field programmable gate array, FPGA), or other programmable logic devices such as discrete gates, transistor logic devices, or discrete hardware components.

The processor 1101 may be configured to control the electronic device 1100, execute a software program, and process data of the software program. The electronic device 1100 may further include a communications unit 1105, to implement signal input (reception) and output (transmission).

For example, the electronic device 1100 may be a chip; the communications unit 1105 may be an input and/or output circuit of the chip, or the communications unit 1105 may be a communication interface of the chip; and the chip may be a component of a terminal device or other electronic devices.

For another example, the electronic device 1100 may be a terminal device, and the communications unit 1105 may be a transceiver of the terminal device, or the communications unit 1105 may be a transceiver circuit of the terminal device.

The electronic device 1100 may include one or more memories 1102 on which a program 1104 is stored. The program 1104 may be executed by the processor 1101 to generate an instruction 1103, so that the processor 1101 executes, according to the instruction 1103, the image processing method described in the foregoing method embodiments.

Optionally, data may be also stored in the memory 1102.

Optionally, the processor 1101 may also read data stored in the memory 1102, the data may be stored in a same storage address as the program 1104, or the data may be stored at a different storage address from the program 1104.

Optionally, the processor 1101 and the memory 1102 may be disposed separately or integrated together, for example, being integrated on a system on chip (system on chip, SOC) of a terminal device.

For example, the memory 1102 may be configured to store the related program 1104 of the image processing method provided in the embodiments of this application, and the processor 1101 may be configured to: during execution of the image processing method, call the related program 1104 of the image processing method stored in the memory 1102 to execute the image processing method in the embodiments of this application: for example, displaying a first screen, where the first screen includes a first control; detecting a first operation on the first control; obtaining a first image sequence in response to the first operation, where the first image sequence includes a first long-exposure image, a first medium-exposure image, and a first short-exposure image; performing preprocessing on the first image sequence to obtain a second image sequence, where the preprocessing is used to select images in the first image sequence that meet a preset condition, and the second image sequence includes a second medium-exposure image and a second short-exposure image; performing fusion processing on the second image sequence to obtain a fused image, where the fused image includes a ghosting region, and the ghosting region is an image region that includes a ghosting artifact in the fused image; and processing the fused image to obtain a third image, where the third image includes part of the fused image, and the third image does not include the ghosting region.

This application further provides a computer program product. When the computer program product is executed by the processor 1101, the image processing method according to any one of the foregoing method embodiments is implemented.

The computer program product may be stored in the memory 1102, and for example, is the program 1104. Through processing procedures such as preprocessing, compilation, assembly, and linking, the program 1104 is finally converted into an executable object file that can be executed by the processor 1101.

This application further provides a computer-readable medium, where a computer program is stored in the computer-readable medium. When the computer program is executed by a computer, the image processing method according to any one of the method embodiments in this application is implemented. The computer program may be a high-level language program or an executable object program.

The computer-readable storage medium is, for example, a memory 1102. The memory 1102 may be a volatile memory or a non-volatile memory, or the memory 1102 may include both a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. As illustrative rather than restrictive description, many forms of RAM can be used, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct Rambus random access memory (direct Rambus RAM, DR RAM).

It may be clearly understood by a person skilled in the art that, for convenient and brief description, for a detailed working process and technical effects of the foregoing apparatus and device, reference may be made to a corresponding process and technical effects in the foregoing method embodiments, and details are not described again herein.

In the several embodiments provided in this application, it should be understood that the disclosed system, apparatus, and method may be implemented in other manners. For example, some features in the described method embodiment may be ignored or not performed. The described apparatus embodiment is merely exemplary. The unit division is merely logical function division and may be other division in actual implementation. A plurality of units or components may be combined or integrated into another system. In addition, couplings between the units or components may be direct couplings or indirect couplings. The couplings include connections in electronic, mechanical, or other forms.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" in this specification are usually used interchangeably. The term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

In summary, what is described above is merely exemplary embodiments of the technical solutions of this application, but is not intended to limit the protection scope of this application. Any modifications, equivalent replacements, or improvements made without departing from the spirit and principle of this application shall fall within the protection scope of this application.

What is claimed is:

1. An image processing method, applied to an electronic device and comprising:
   displaying a first screen, wherein the first screen comprises a first control;
   detecting a first operation on the first control;
   obtaining a first image sequence in response to the first operation, wherein the first image sequence comprises a first long-exposure image, a first medium-exposure image, and a first short-exposure image;
   performing preprocessing on the first image sequence to obtain a second image sequence, wherein the preprocessing is used to select images in the first image sequence that meet a preset condition;
   when the second image sequence comprises a second medium-exposure image and a second short-exposure image, performing fusion processing on the second image sequence to obtain a fused image, wherein the fused image comprises a ghosting region, and the ghosting region is an image region that comprises a ghosting artifact in the fused image; and
   processing the fused image to obtain a third image, wherein the third image comprises part of the fused image, and the third image does not comprise the ghosting region; and when the second image sequence comprises only a second medium-exposure image, performing fusion processing on the second image sequence to output a low-dynamic range image.

2. The image processing method according to claim 1, wherein the processing the fused image to obtain a third image comprises:
   performing ghosting detection processing on a reference image and the second short-exposure image to obtain a mask, wherein the reference image is any frame of image in the first medium-exposure image; and
   processing the fused image based on the mask to obtain the third image.

3. The image processing method according to claim 2, wherein the processing the fused image based on the mask to obtain the third image comprises:
   determining the ghosting region in the fused image based on the mask; and
   processing the ghosting region according to a hole filling algorithm to obtain the third image.

4. The image processing method according to claim 2, wherein the preset condition comprises a first preset condition, the first preset condition is that an exposure value of an image in the first image sequence is a preset exposure value, and the performing preprocessing on the first image sequence to obtain a second image sequence comprises:
   selecting first target exposure images in the first image sequence that meet the first preset condition, wherein the first target exposure images comprise at least two frames of image; and
   obtaining the second image sequence based on the first target exposure images.

5. The image processing method according to claim 4, wherein the preset exposure value comprises a first preset exposure value and/or a second preset exposure value, the first preset exposure value is a preset exposure value of the first long-exposure image, and the second preset exposure value is a preset exposure value of the first short-exposure image.

6. The image processing method according to claim 4, wherein the preset condition comprises a second preset condition, the second preset condition is that a proportion of same image content between an image in the first target exposure images and the reference image is a preset proportion value, and the obtaining the second image sequence based on the first target exposure images comprises:
   comparing the first target exposure images with the reference image to obtain a proportion value, wherein the proportion value is used to indicate the proportion of same image content as the reference image;
   selecting, based on the proportion value, second target exposure images in the first target exposure images that meet the second preset condition; and
   forming the second image sequence by the second target exposure images.

7. The image processing method according to claim 1, wherein the performing fusion processing on the second image sequence to obtain a fused image comprises:
   inputting the second image sequence into a fusion model to obtain the fused image, wherein the fusion model is used for fusion processing on the second image sequence, and the fusion model is a convolutional neuron network.

8. The image processing method according to claim 1, before the detecting a first operation on the first control, further comprising:
   detecting a second operation, wherein the second operation is used to indicate enabling a high-dynamic range image shooting mode of the electronic device.

9. The image processing method according to claim 1, before the detecting a first operation on the first control, further comprising:
   obtaining a preview image;
   determining a first value based on the preview image, wherein the first value is used to indicate a proportion of an over-exposure region in the preview image; and
   determining based on the first value to enable the high-dynamic range image shooting mode of the electronic device.

10. An electronic device, comprising:
    one or more processors and a memory; wherein
    the memory is coupled to the one or more processors, the memory is configured to store computer program code, the computer program code comprises computer instructions, and the one or more processors invoke the computer instructions to cause the electronic device to execute the following steps:
    displaying a first screen, wherein the first screen comprises a first control;
    detecting a first operation on the first control;
    obtaining a first image sequence in response to the first operation, wherein the first image sequence comprises a first long-exposure image, a first medium-exposure image, and a first short-exposure image;
    performing preprocessing on the first image sequence to obtain a second image sequence, wherein the preprocessing is used to select images in the first image sequence that meet a preset condition;
    when the second image sequence comprises a second medium-exposure image and a second short-exposure image, performing fusion processing on the second image sequence to obtain a fused image, wherein the fused image comprises a ghosting region, and the ghosting region is an image region that comprises a ghosting artifact in the fused image; and
    processing the fused image to obtain a third image, wherein the third image comprises part of the fused image, and the third image does not comprise the ghosting region; and
    when the second image sequence comprises only a second medium-exposure image, performing fusion processing on the second image sequence to output a low-dynamic range image.

11. The electronic device according to claim 10, wherein the processing the fused image to obtain a third image comprises:
    performing ghosting detection processing on a reference image and the second short-exposure image to obtain a mask, wherein the reference image is any frame of image in the first medium-exposure image; and
    processing the fused image based on the mask to obtain the third image.

12. The electronic device according to claim 11, wherein the processing the fused image based on the mask to obtain the third image comprises:
    determining the ghosting region in the fused image based on the mask; and
    processing the ghosting region according to a hole filling algorithm to obtain the third image.

13. The electronic device according to claim 11, wherein the preset condition comprises a first preset condition, the first preset condition is that an exposure value of an image in the first image sequence is a preset exposure value, and the performing preprocessing on the first image sequence to obtain a second image sequence comprises:
    selecting first target exposure images in the first image sequence that meet the first preset condition, wherein the first target exposure images comprise at least two frames of image; and
    obtaining the second image sequence based on the first target exposure images.

14. The electronic device according to claim 13, wherein the preset exposure value comprises a first preset exposure value and/or a second preset exposure value, the first preset exposure value is a preset exposure value of the first long-exposure image, and the second preset exposure value is a preset exposure value of the first short-exposure image.

15. The electronic device according to claim 13, wherein the preset condition comprises a second preset condition, the second preset condition is that a proportion of same image content between an image in the first target exposure images and the reference image is a preset proportion value, and the obtaining the second image sequence based on the first target exposure images comprises:
    comparing the first target exposure images with the reference image to obtain a proportion value, wherein the proportion value is used to indicate the proportion of same image content as the reference image;
    selecting, based on the proportion value, second target exposure images in the first target exposure images that meet the second preset condition; and
    forming the second image sequence by the second target exposure images.

16. The electronic device according to claim 10, wherein the performing fusion processing on the second image sequence to obtain a fused image comprises:
    inputting the second image sequence into a fusion model to obtain the fused image, wherein the fusion model is used for fusion processing on the second image sequence, and the fusion model is a convolutional neuron network.

17. The electronic device according to claim 10, wherein the computer instructions cause the electronic device to further execute the following steps:
    detecting a second operation, wherein the second operation is used to indicate enabling a high-dynamic range image shooting mode of the electronic device.

18. The electronic device according to claim 10, wherein the computer instructions cause the electronic device to further execute the following steps:
    obtaining a preview image;
    determining a first value based on the preview image, wherein the first value is used to indicate a proportion of an over-exposure region in the preview image; and
    determining based on the first value to enable the high-dynamic range image shooting mode of the electronic device.

19. The electronic device according to claim 10, wherein the first screen is a photographing screen, and the first control is a control for indicating to take a photograph; or
    the first screen is a video shooting screen, and the first control is a control for indicating to shoot a video; or
    the first screen is a video call screen, and the first control is a control for indicating to make a video call.

20. A non-transitory computer-readable storage medium, wherein the computer-readable storage medium stores a computer program, and when the computer program is executed by a processor, an electronic device is caused to execute the following steps:
    displaying a first screen, wherein the first screen comprises a first control;
    detecting a first operation on the first control;
    obtaining a first image sequence in response to the first operation, wherein the first image sequence comprises a first long-exposure image, a first medium-exposure image, and a first short-exposure image;
    performing preprocessing on the first image sequence to obtain a second image sequence, wherein the preprocessing is used to select images in the first image sequence that meet a preset condition;
    when the second image sequence comprises a second medium-exposure image and a second short-exposure image, performing fusion processing on the second image sequence to obtain a fused image, wherein the fused image comprises a ghosting region, and the ghosting region is an image region that comprises a ghosting artifact in the fused image; and
    processing the fused image to obtain a third image, wherein the third image comprises part of the fused image, and the third image does not comprise the ghosting region; and
    when the second image sequence comprises only a second medium-exposure image, performing fusion processing on the second image sequence to output a low-dynamic range image.

* * * * *